United States Patent [19]

Honma et al.

[11] Patent Number: 5,051,767
[45] Date of Patent: Sep. 24, 1991

[54] DISTANCE MEASURING DEVICE

[75] Inventors: Akira Honma, Yokohama; Satoshi Takami, Saitama, both of Japan

[73] Assignee: Asahi Kogaku Kogyo Kabushiki Kaisha, Tokyo, Japan

[21] Appl. No.: 520,525

[22] Filed: May 8, 1990

[30] Foreign Application Priority Data

May 9, 1989 [JP] Japan .................................. 1-115297

[51] Int. Cl.$^5$ ............................................. G03B 13/36
[52] U.S. Cl. .................................... 354/406; 354/408; 354/403
[58] Field of Search ............... 354/400, 402, 406, 407, 354/408, 403

[56] References Cited

U.S. PATENT DOCUMENTS

| | | | |
|---|---|---|---|
| 4,506,970 | 3/1985 | Fujibayashi | 354/406 |
| 4,636,624 | 1/1987 | Ishida et al. | |
| 4,812,912 | 3/1989 | Iida et al. | 354/402 |
| 4,814,810 | 3/1989 | Ishiguro | |
| 4,833,497 | 5/1989 | Sugawara | |
| 4,912,495 | 3/1990 | Ishikawa et al. | 354/402 |

FOREIGN PATENT DOCUMENTS

| | | |
|---|---|---|
| 59-126517 | 7/1984 | Japan |
| 62-156608 | 7/1987 | Japan |
| 62-195128 | 12/1987 | Japan |
| 63-208026 | 8/1988 | Japan |
| 63-35909 | 9/1988 | Japan |

OTHER PUBLICATIONS

Japanese publication by M. Misawa et al., "Integrated Circuit for Automatic Focusing", p. 470–473, Fuji Timely, vol. 61, No. 7, (1988).
Japanese Publication by S. Hashiguchi, "Electric Eye", p. 57, Shashin Koguyou (Nov. 1985)
Japanese Publication, "First Look", Chinon Multi-AF Auto 3001, Shashin Koguyou (Nov. 1987).
Japanese Publication, "First Look", Minolta Mac-Tele, p. 28–29 Shashin Koguyou (Jul. 1988).
Abstract of Japanese Publication No. 62-156608.

Primary Examiner—Russell E. Adams, Jr.
Attorney, Agent, or Firm—Sandler, Greenblum, & Bernstein

[57] ABSTRACT

In a camera provided with a finder and a photographic lens, the focal length of the photographic lens being variable, there is provided a distance measuring device having a pair of optical elements at the front side of the camera, the optical axes of the pair of optical elements being different from the optical axis of the finder, and a line sensor having a pair of image-receiving areas for receiving a pair of images of a photographed object through the pair of optical elements. The respective image-receiving area of the line sensors are selected depending on the focal length of the photographic lens, which corresponds to the range at which an object to be photographed is located. In addition, there is provided an auxiliary light projector for projecting a pattern image to the object to be photographed, the image magnification of which being variable corresponding to the focal length of the photographic lens. Furthermore, the image-receiving areas are divided into a plurality of portions for better measuring the distances of the objects to be photographed, which are located at different depths in a three dimensional field of view.

41 Claims, 24 Drawing Sheets

FIG. 9
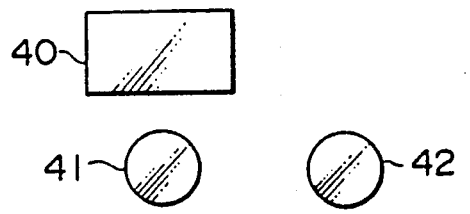
FIG. 10A  FIG. 10B
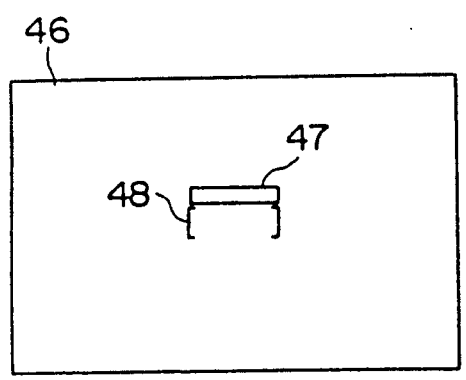 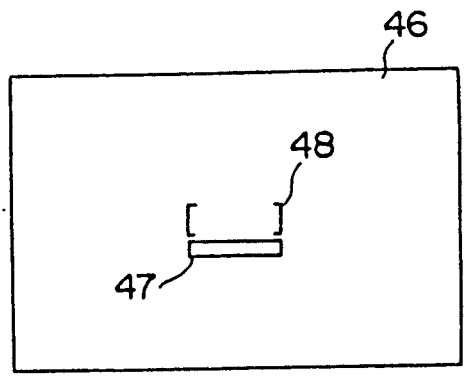
FIG. 11
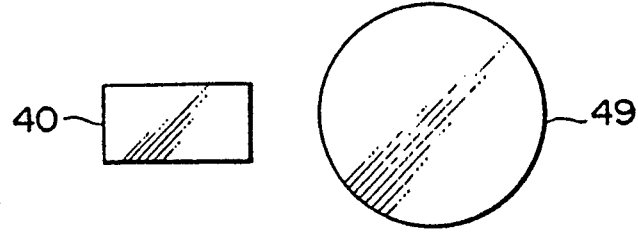

WIDE ANGLE LENS
(35mm)

STANDARD LENS
(70 mm)

TELEPHOTOGRAPHIC
LENS (105mm)

WIDE ANGLE LENS

STANDARD LENS

TELEPHOTOGRAPHIC LENS

WIDE ANGLE LENS

STANDARD LENS

TELEPHOTOGRAPHIC LENS

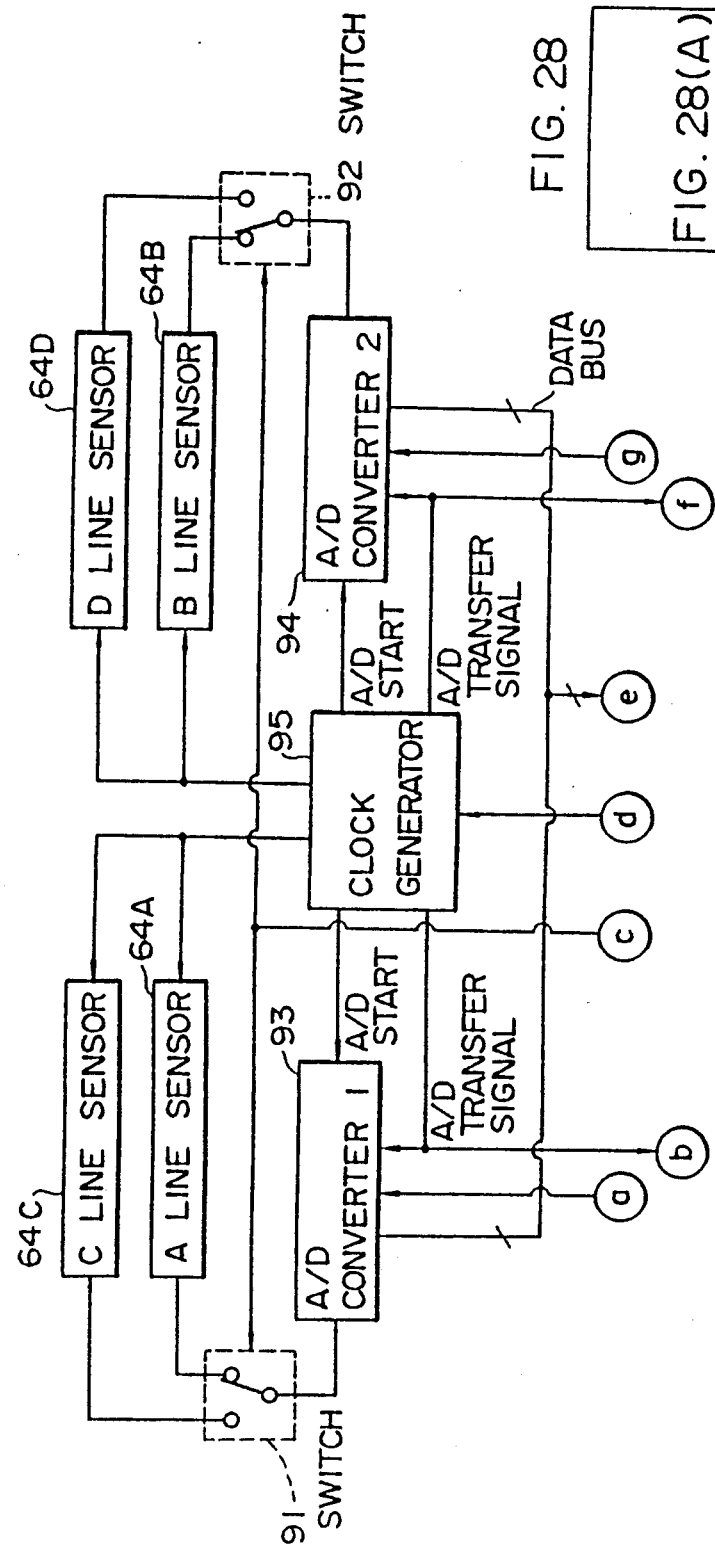
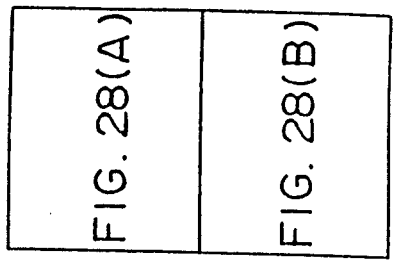

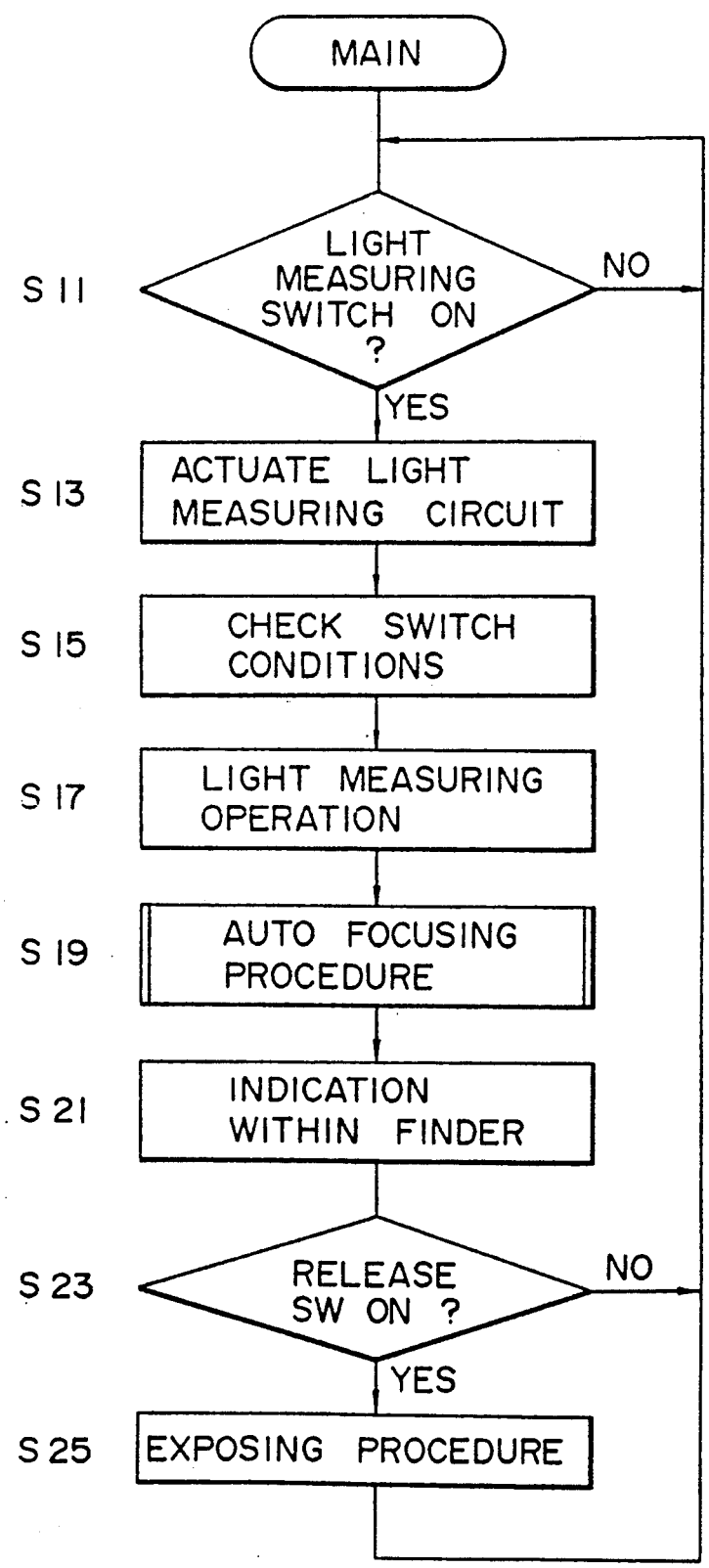

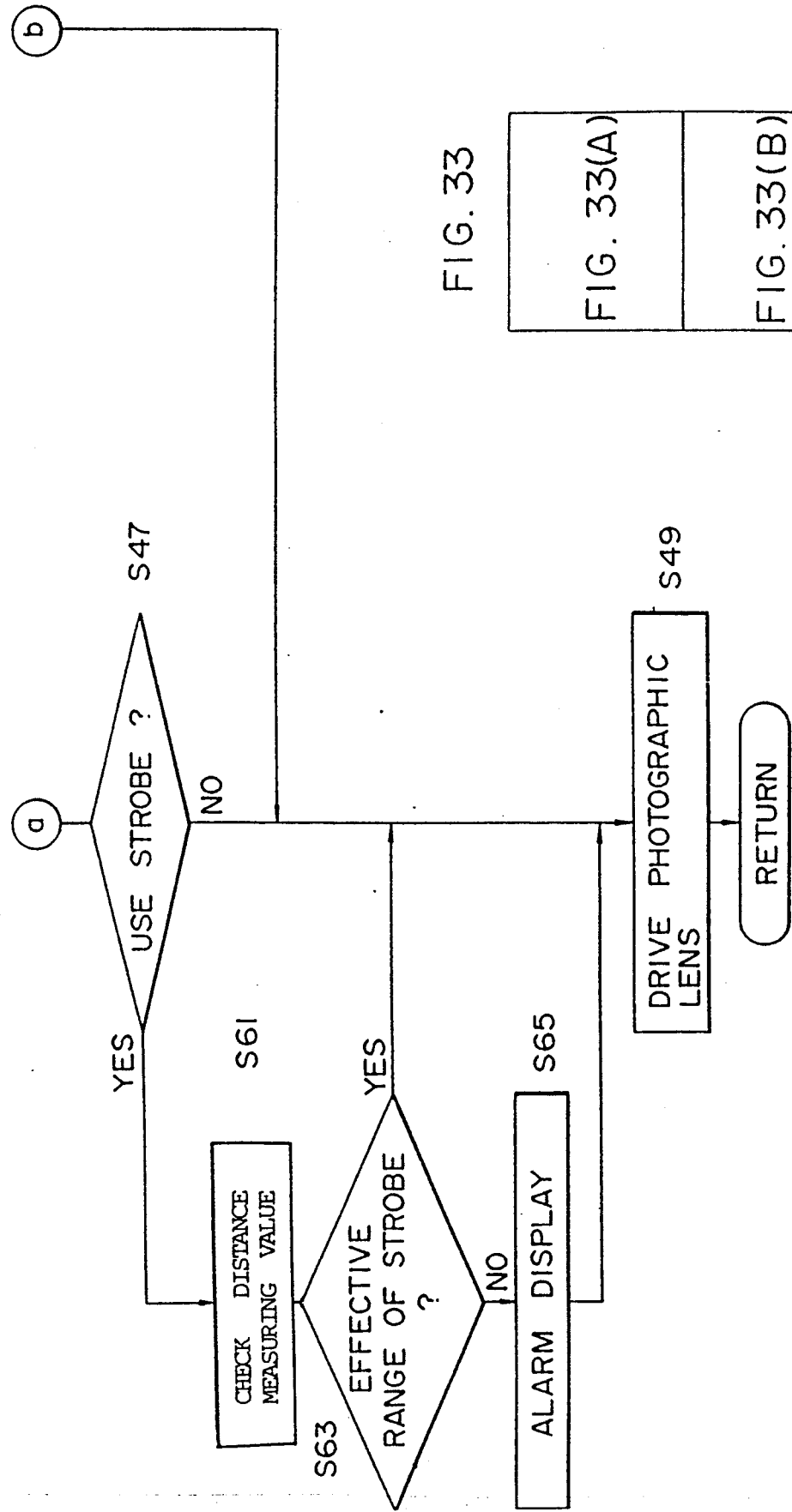

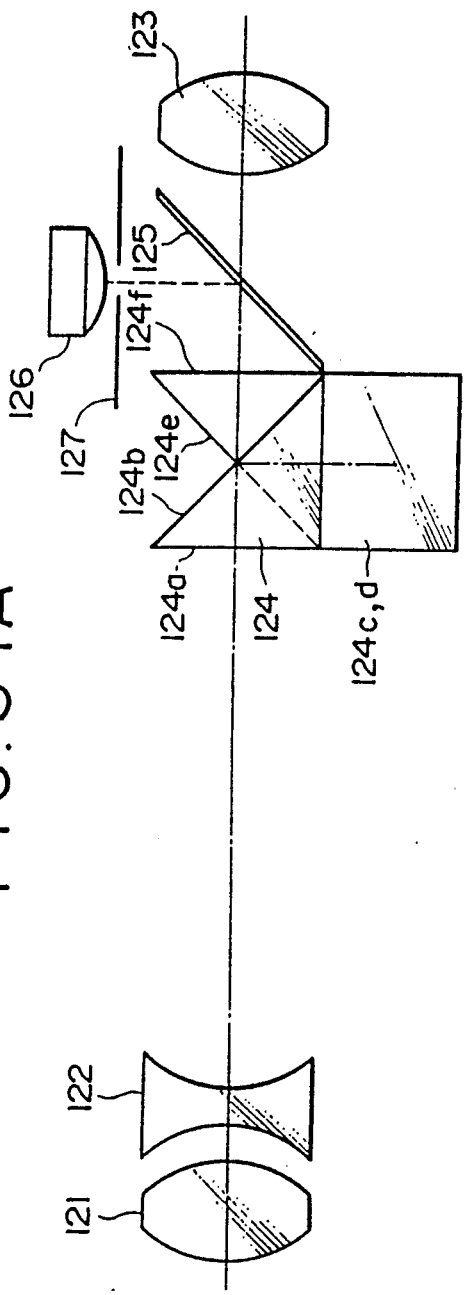
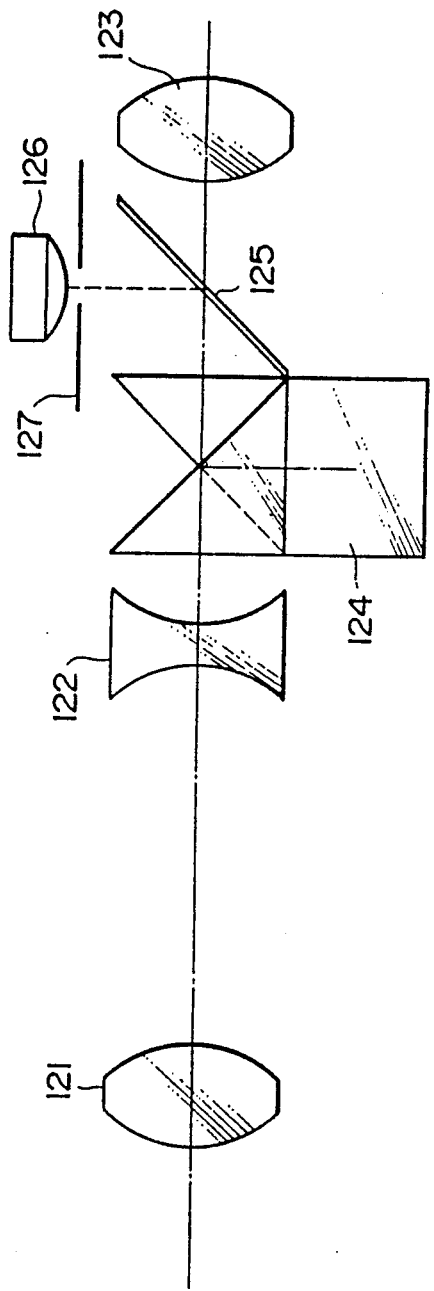
FIG. 34A
FIG. 34B

DISTANCE MEASURING DEVICE

BACKGROUND OF THE INVENTION

The present invention relates to distance measuring devices for cameras, and more particularly, to a passive distance measuring device in which optical axes of a finder and those of optical elements of the distance measuring device are not aligned with each other.

Conventional distance measuring devices provided with automatic focusing systems (AF systems), often use a passive distance measuring device which utilizes external light. The passive distance measuring device of an automatic focusing system is mainly employed in a lens-shutter type camera in which a photographic optical system, a finder and a distance measuring optical system of the AF system are separately arranged. A brief description will subsequently be given of a lens-shutter type camera provided with a conventional distance measuring device with reference to FIGS. 1 through 3 inclusive. A photographic lens 12, a finder (objective window) 14, and a light emitting window 16 for a built-in strobe are provided on the front panel of a camera body 10 with a shutter release button 18 on the top surface thereof. Further, a pair of AF lenses 22, 23 of a distance measuring device 20 are disposed above the photographic lens 12 on the front panel of the camera body 10.

FIGS. 2 and 3 are a bottom and an elevational view of the distance measuring device 20, respectively. Before being projected on a distance measuring sensor 30, rays of light from the subject introduced from the pair of AF lenses 22, 23 are substantially inwardly reflected by respective mirrors 24, 25 at right angles and passed through respective condenser lenses 26, 27 to become incident upon a mirror prism 28 where they are rearwardly reflected at right angles.

The distance measuring sensor 30 is, as shown in an elevational view of FIG. 4, provided with a light receiving unit equipped with a CCD (Charge Coupled Device) line sensor 32 having a number of light receiving elements arranged in a row. The line sensor 32 consists of two sections 32A, 32B disposed in the row and the luminous flux of an object introduced from the pair of AF lenses 22, 23 is projected on the respective line sensors 32A, 32B. Each light receiving element of the line sensor 32 submits the projected image of the subject to photoelectric conversion and stores the image in the form of a signal charge. Numeral 34 denotes a monitor sensor for use in finding the optimum signal charge accumulation time for the line sensor 32.

A control system in the camera body is used for reading the signal charge stored in the light receiving elements of the line sensor 32, computing an object distance through operations, and driving a focusing lens up to a focusing position according to the measured value of distance.

A description will be given of the relation of a distance measuring zone to a finder field in the aforementioned camera with reference to FIG. 5. In this camera, the finder 14 is interlocked with the zooming of the photographic lens 12 to change its field magnification. If the portion of the object projected to the line sensor 32 on a finder field 36 is to be a distance measuring zone, the distance measuring zone at telephoto position becomes the zone as is shown in FIG. 5 as 37T. The finder field 36 is provided with a distance measuring frame 38 for visualizing the distance measuring zone. When the photographic lens 12 in this state is caused to zoom toward a wide angle, the field magnification of the finder 14 lowers but the size of the field frame 38 remains unchanged.

Despite the zooming, on the other hand, the magnification of the distance measuring device 20 also remains unchanged. As a result, a distance measuring zone 37W on the finder field 36 becomes small at a wide angle as shown in FIG. 5.

With reference to FIGS. 6A and 6B, a description will further be given of the relation between the finder field 36 and the distance measuring zone in cases of a telephoto and a wide angle when the same object is photographed from the same position.

At the telephoto position, it is assumed that an object image 39 on the finder field 36 and the distance measuring zone 37T are those illustrated in FIG. 6A. In this case, when the photographic lens 12 is zoomed toward the wide angle, the field magnification of the finder 12 lowers. Consequently, the object image 39 on the finder field 36 becomes smaller up to the size shown in FIG. 6B at the end of the wide angle.

On the other hand, the size of the distance measuring zone relative to the object does not vary since the magnification of the distance measuring device 20 remains unchanged as stated above. In other words, the size of the distance measuring zone relative to the object image 39 is constant. As shown in FIG. 6B, the distance measuring zone 37W on the finder field 36 has also becomes as small as the object image 39.

In the conventional distance measuring device 20, the size of the distance measuring zone on the finder field 36 would change as stated above as the field magnification of the finder 14 changes. In other words, because the size of the distance measuring zone occupying the finder field 36 varies with the focal length of the photographic lens 12, the problem is that an error in distance measuring may be made by measuring distance to an object not intended to be photographed by a photographer.

Moreover, the optical axis of the finder is separated from that of the distance measuring device in the conventional camera. As shown in FIG. 7, for instance, a pair of AF lenses 41, 42 of a distance measuring system and a finder 40 are provided substantially in a horizontal row as viewed from the front of the camera. A distance measuring frame 48 for visualizing a distance measuring zone 47 is provided in a finder field 46 of the finder 40 as shown in FIGS. 8A and 8B.

As stated above, however, the optical axis of the finder 40 is separated from those of the AF lenses 41 and 42. For this reason, the distance measuring frame 48 tends to shift from the actual distance measuring zone 47, depending on the subject distance. If the distance measuring zone 47 is arranged as to coincide with the distance measuring frame 48 at a standard range, for instance, the distance measuring zone 47 tends to shift to the right of the distance measuring frame 48 in the case of the subject located at a short distance (see FIG. 8A), whereas the distance measuring zone 47 tends to shift to the left of the distance measuring frame 48 in the case of the subject at a long distance.

When the AF lenses 41, 42 are disposed under the finder 40 as shown in FIG. 9, moreover, the distance measuring zone 47 tends to shift upward with respect to the distance measuring frame 48 in the case of the subject located at a short distance (FIG. 10A), whereas it tends to shift downward in the case of the subject at a long distance (FIG. 10B).

More specifically, since the optical axis of the finder is in coincident with that of the AF optical system, the distance of the subject shifted from the distance measuring frame 48 on the finder field 46 is being measured. The problem is therefore that the object which ought to have been photographed with the distance measuring frame 48 exactly focused thereon is found out of focus on a developed print.

A shift similar to what has been discussed above is amplified in a camera in which the optical axis of the finder deflects in the direction of the optical axis of the photographic lens because of the shifting of the finder field from the photographic image plane is corrected in macrophotography. As shown in FIG. 11, for instance, the optical axis of the finder 40 is caused to swing toward the photographic lens 49 in such a camera so that the finder 40 is transversely shifted towards the photographic lens 49. When the distance measuring frame 48 is coincident with the distance measuring zone 47 for standard photographs on the finder field 46 (FIG. 12A), the distance measuring zone 47 tends to shift to the left in macrophotography (FIG. 12B).

As shown in FIG. 13, moreover, the optical axis of the finder 40 is caused to swing down toward the optical axis of the photographic lens 49 in macrophotography when the finder 40 is provided above the photographic lens 49. As a result, even if the distance measuring zone 47 is coincident with the distance measuring frame 48 for standard photography time, it still poses a problem in that the former shifts from the latter (FIGS. 14A, for macrophotography).

In a camera equipped with a conventional distance measuring device, the photographic image plane or distance measuring zone on the finder field is caused to shift if the subject distance varies, since the optical axis of the photographic optical system has shifted from that of the AF optical system.

In addition to the problem stated above, another disadvantage is that the exclusive area of the photographic image plane or distance measuring zone on the finder field changes if the focal length changes when the photographic lens is a variable focal length lens such as a bifocal or zoom lens.

To solve the aforementioned first problem, there has been developed a means for forming the distance measuring sensor (line sensor) transversely longer (wider).

If however the line sensor is relied upon, the distance measuring zone becomes wider in the transverse direction. Then, as shown in FIG. 15, for instance, images of a plurality of portions of an object longitudinally spaced apart (i.e., a three-dimensional object) may be projected on the line sensor 32. In this case, the focus calculating operational means is unable to decide which one of the object images should be selected as a basis for performing a focusing operation, which also results in a problem that no correct object distance is available for use by the focusing mechanism.

When a camera equipped with the distance measuring device and a strobe is used to photograph a plurality of objects located different distances from the camera by means of the strobe, the quantity of light emitted by the strobe becomes inappropriate to the object if the strobe is focused on an object that is located outside the range of its use and this results in improper exposure. On the other hand, the properly exposed object will be out of focus. Thus, no objects are photographed properly.

In a camera equipped with an auxiliary projector for projecting a stripe pattern image onto a dark object or one that offers a low contrast to be photographed, the spot diameter (irradiation angle), if it has been adjusted to the distance measuring zone at a wide angle position, for instance, will become wider than the distance measuring zone at the telephoto position to increase wasteful irradiation. Thus long distance cannot be covered by the radiation of the auxiliary projector.

SUMMARY OF THE INVENTION

In view of the foregoing problems of the passive distance measuring device of the conventional camera, it is therefore an object of the present invention to provided a distance measuring device capable of keeping constant the position and exclusive area of a distance measuring zone on a finder field, irrespective of the lens focal length of a camera in which the optical axis of the finder is displaced from the optical axis of the distance measuring device.

It is another object of the invention to provide an automatic focusing camera capable of keeping constant the position and exclusive area of a distance measuring zone on a finder field, irrespective of the object distance.

It is a further object of the invention to provide an automatic focusing camera having a distance measuring device for measuring distances of objects located at a plurality of distances.

It is a still further object of the invention to provide an automatic focusing camera equipped with an auxiliary light projecting device for projecting a pattern image onto an object which is capable of varying the magnification of the pattern image to be projected corresponding to the focal length of the photographic lens.

To accomplish the above objects, according to the invention, there is provided a distance measuring device for measuring object distances in a camera which is provided with a finder and a photographic lens, and wherein the focal length of the photographic lens is variable. The said distance measuring device including:

a pair of optical elements provided at the front side of the camera, with the optical axes of the said pair of optical elements being different from the optical axis of the finder;

line sensor means having a pair of image-receiving areas for receiving a pair of images of the same photographing object through the pair of optical elements, respectively and a control means for varying the effective range of the respective effective image-receiving area of the line sensor means depending upon the focal length of the photographic lens.

According to another aspect of the invention, there is provided an automatic focusing camera, including comprising:

a pair of optical elements provided at the front side of the camera, the optical axes of the said pair of optical elements being different from the optical axis of a finder of the camera;

line sensor means having a pair of image-receiving areas for receiving a pair of images of the same photographing object through the pair of optical elements, and a distance measuring means for preliminarily measuring object distance; and control means for shifting the pair of image-receiving areas of the line sensor means depending upon the object distance obtained by the distance measuring means.

According to a further aspect of the invention, there is provided an automatic focusing camera provided with a photographic lens, the focal length of which is variable, including:

a pair of optical elements provided at the front side of the camera, optical axes of the pair of optical elements being different from the optical axis of a finder of the camera;

line sensor means having a pair of image-receiving areas for receiving a pair of images of a same photographing object through the pair of optical elements, respectively; and distance measuring means for preliminarily measuring object distance;

first control means for shifting the pair of image-receiving areas of the line sensor means depending upon the object distance obtained by the distance measuring means;

second control means for varying the effective range of the respective image-receiving area of the line sensor means depending upon the focal length of the photographic lens.

According to a still further aspect of the invention, there is provided an automatic focusing camera, including:

a photographic lens, the focal length of which is variable; and an auxiliary light projecting system for projecting a predetermined pattern image toward the photographing object, the magnification of the pattern image varying corresponding to variation of the focal length of said photographing lens.

DESCRIPTION OF THE ACCOMPANYING DRAWINGS

FIGS. 7, 8A, 8B, 9, 10A, 10B are diagrams illustrating problems posed by different object distances in the conventional distance measuring system;

FIGS. 11, 12A, 12B, 13, 14A, 14B are diagrams illustrating problems posed at macrophotographic positions in a conventional passive distance measuring device;

Figure 29:
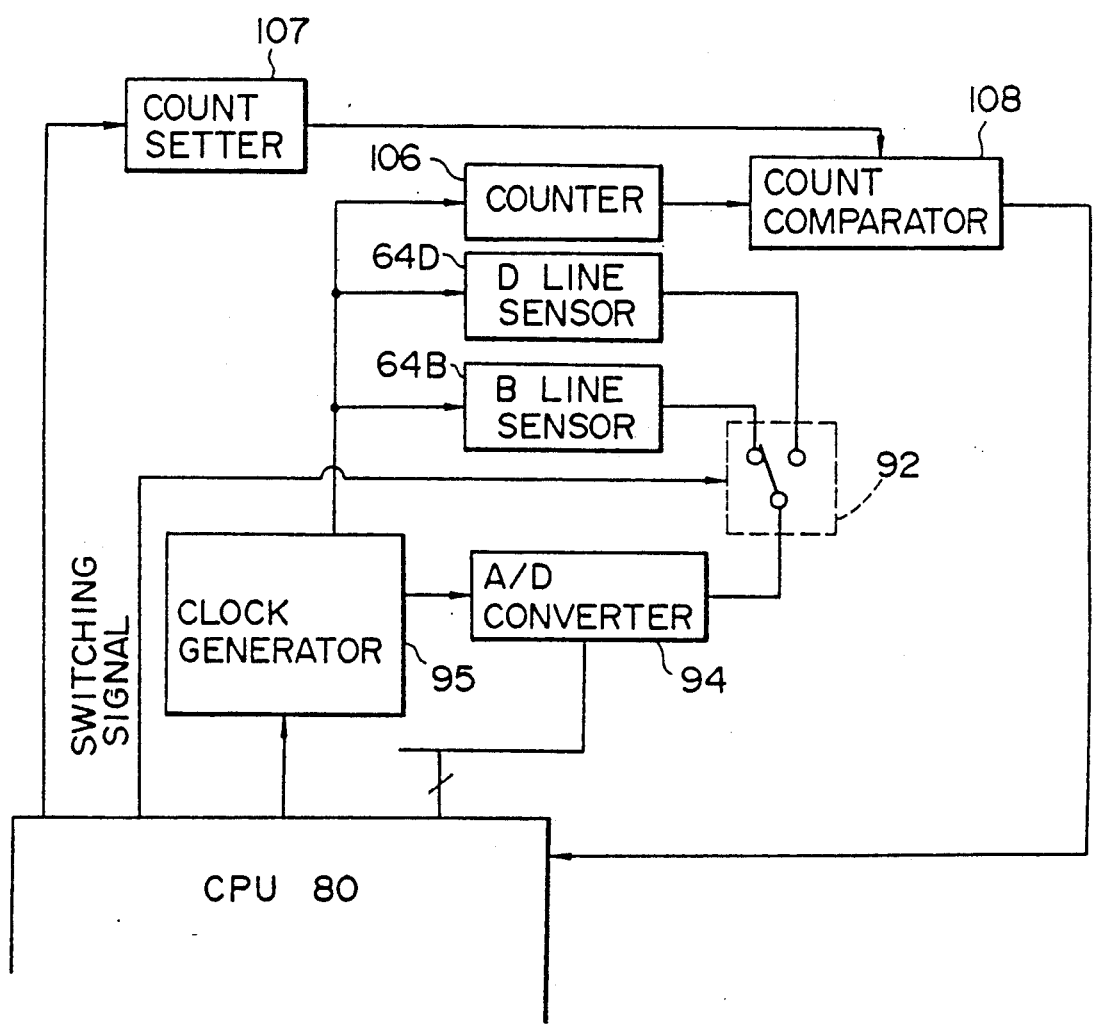
Figure 30:
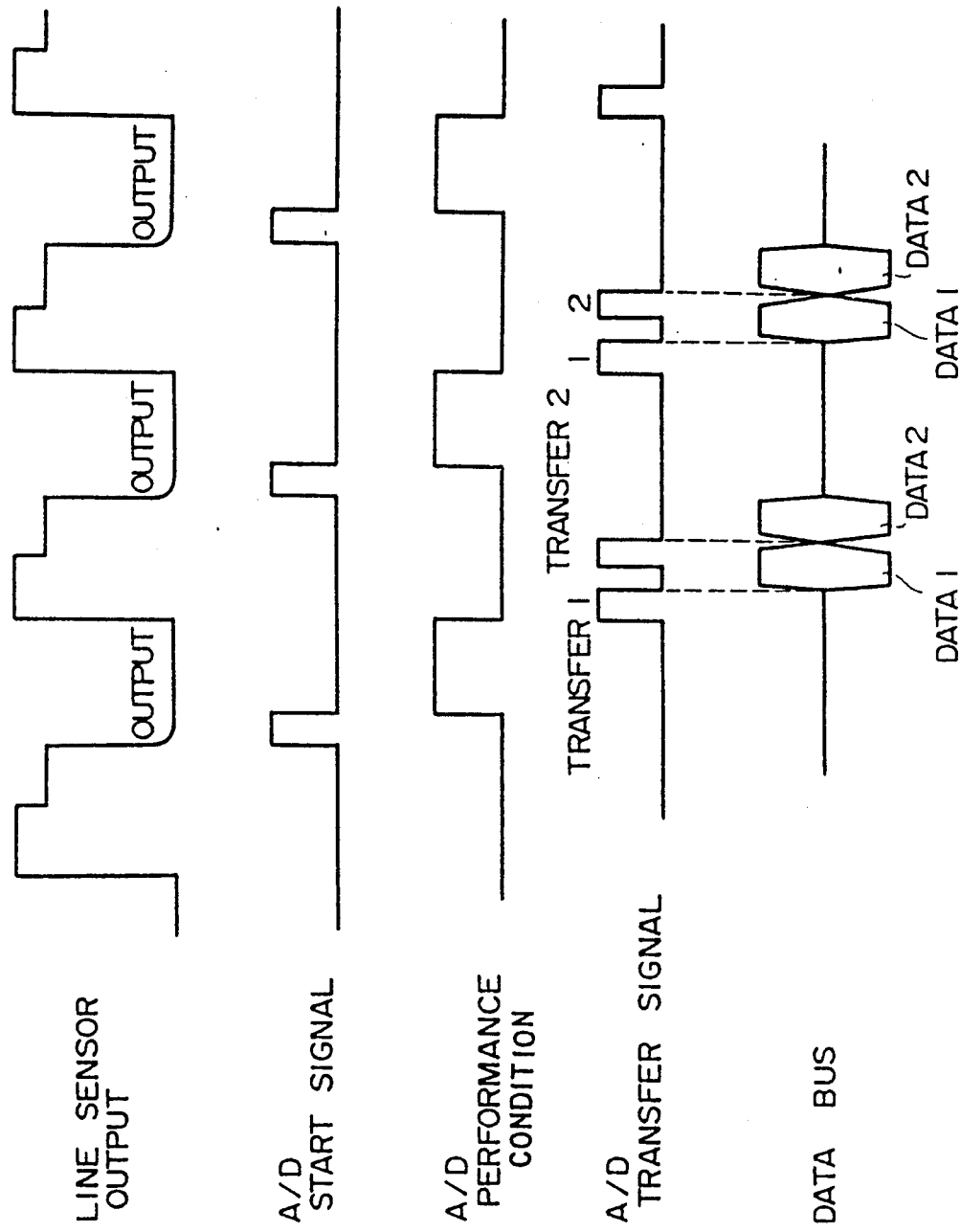
Figure 31A:
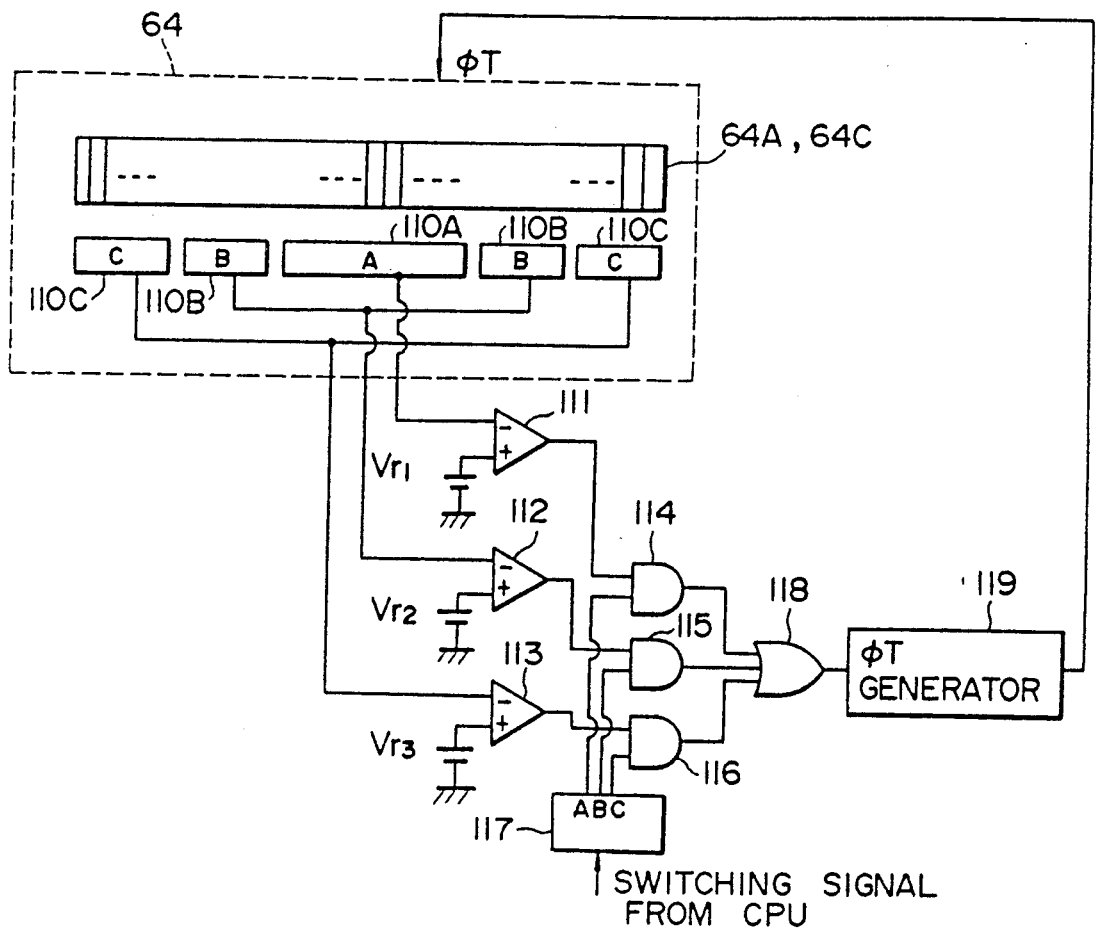
Figure 31B:
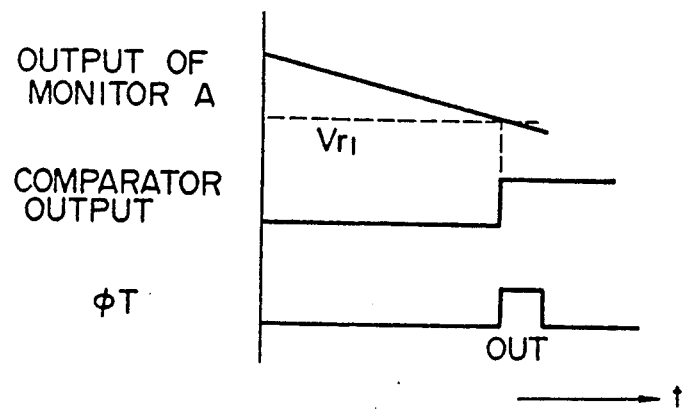
Figure 33A:
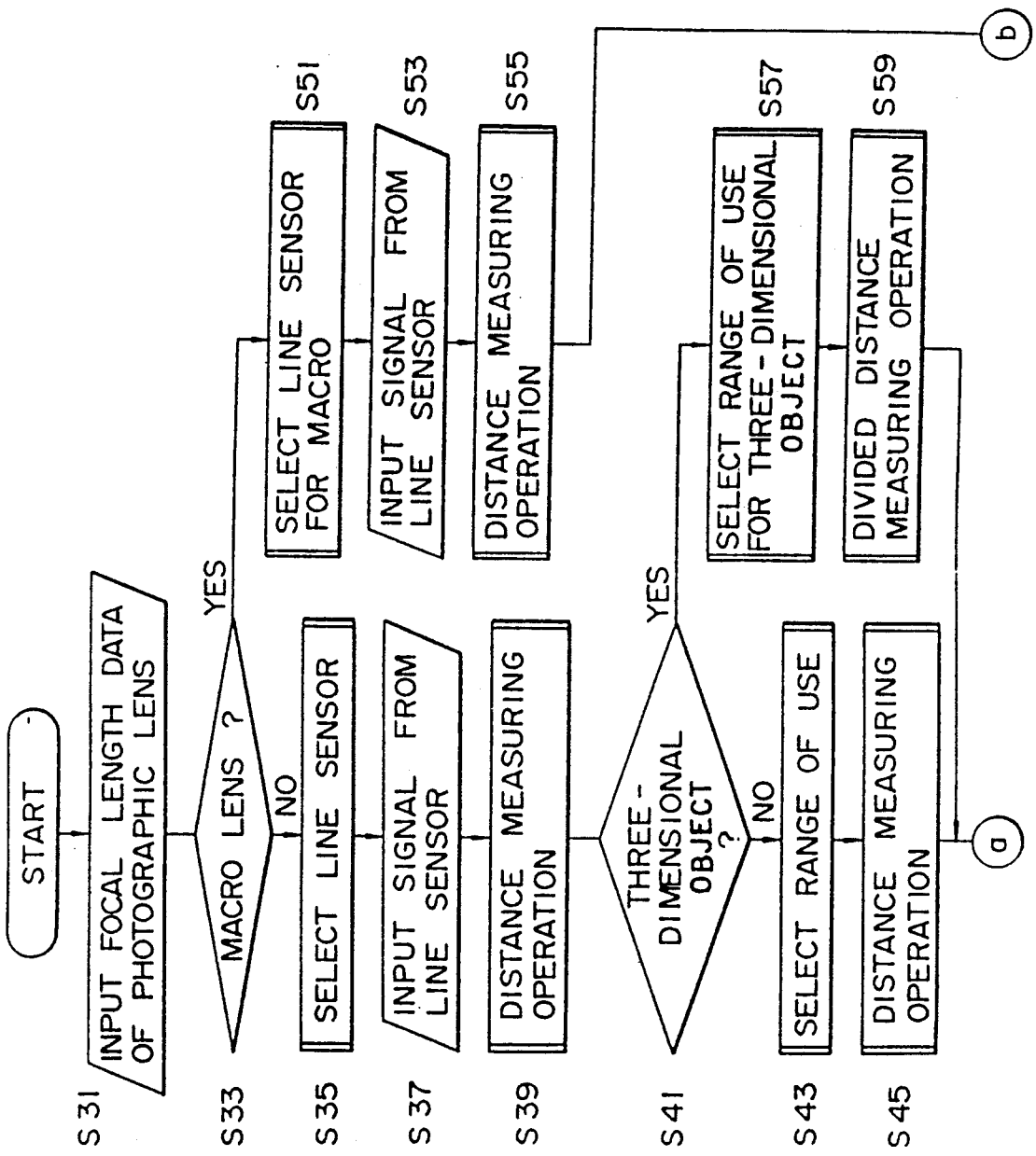
Figure 35:
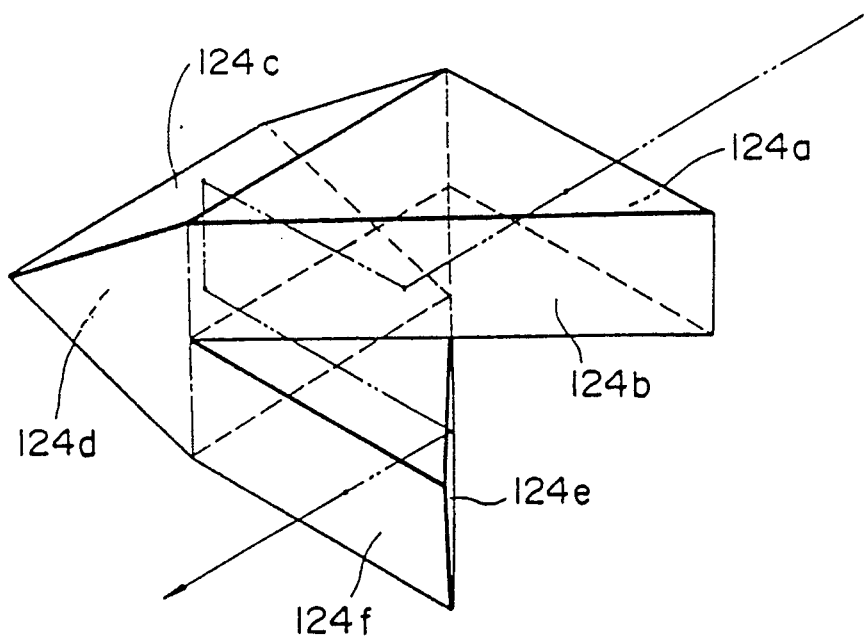

FIGS. 28(A) and (B) illustrate, in block diagram form, a control circuit in a camera having the distance measuring device embodying the present invention;

FIG. 29 is a circuit diagram specifically illustrating the periphery of the line sensor in the control circuit;

FIG. 30 is a timing chart illustrating timing of various parts of the control circuit of FIG. 28;

FIG. 31A is a diagram of a circuit for controlling the accumulation control time of the line sensor;

FIG. 31B is a timing chart of the accumulation control time for the circuit of FIG. 31A;

FIGS. 32 and 33 are operation flowcharts of the present invention;

FIGS. 34A, 34B are diagrams illustrating optical paths of an auxiliary projector embodying the present invention; and FIG. 35 is a perspective view of the prism of the auxiliary projector according to the present invention.

DESCRIPTION OF THE PREFERRED EMBODIMENTS

The present invention is applicable to an optical system in any conventional distance measuring device. Further, the distance measuring device can be mounted on any conventional camera. The arrangement of the optical system in such a conventional camera will be referred to in FIGS. 16 through 18.

Figure 4:
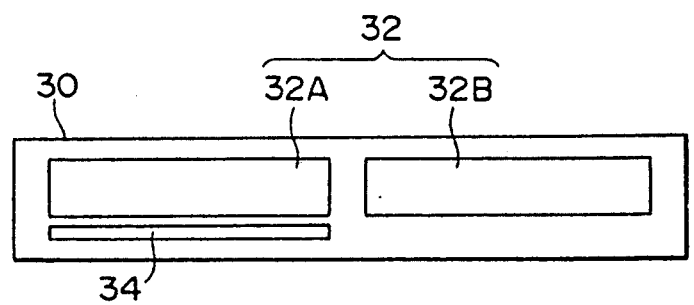
FIG. 4 is an elevational view of the construction of a conventional line sensor.
Figure 5:
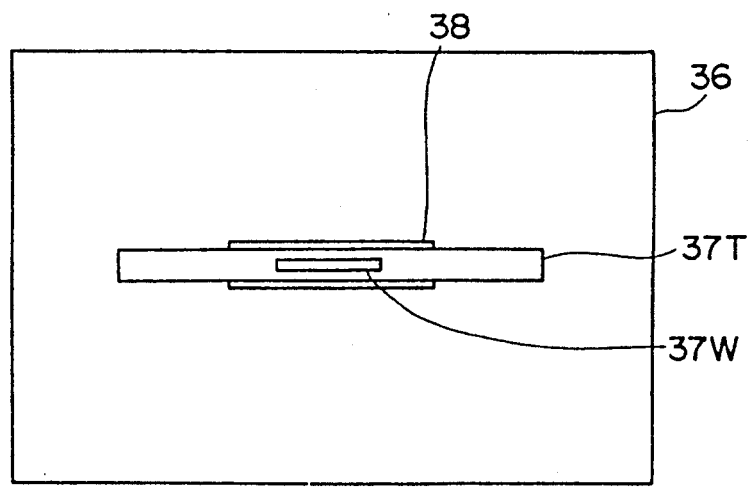
FIGS. 5 and 6A, 6B are diagrams illustrating problems at a wide angle and telephoto positions on the finder field of a conventional camera that the present invention solves.
Figure 16:
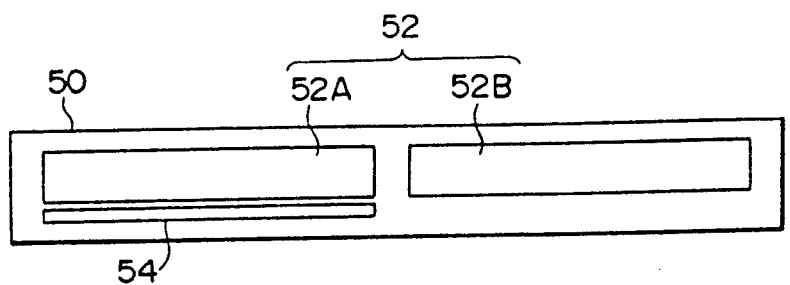
FIG. 16 is an elevational view of the construction of a distance measuring sensor for use in the first embodiment of a distance measuring device of the invention.
Figure 18A:
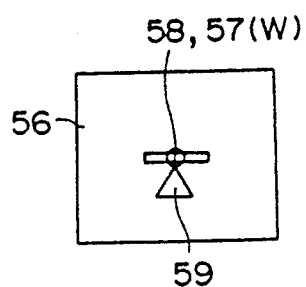
FIGS. 18A and 18B are diagrams illustrating finder fields at a wide angle and a telephoto positions in a camera provided with the distance measuring device embodying the present invention.

FIG. 16 is an elevational view of a distance measuring sensor 50, according to a first embodiment of the present invention. This distance measuring sensor 50 has a pair of line sensors 52A, 52B symmetrically arranged in a horizontal row as in the case of the conventional distance measuring sensor 30 in FIG. 4. However, each of the line sensors 52A, 52B is transversely (i.e., widthwise), longer than each of the conventional line sensors 32A, 32B. An object image is projected onto each of the line sensors 52A, 52B via respective corresponding AF lenses 22, 23. A description will now be given of the construction and operation of the line sensor 52A and the monitor sensor 54 onto which the object image introduced from one AF lens 22 is projected. The luminous flux of the object passed through the AF lens 22 is projected over the whole range of the line sensor 52A. The range of the line sensor 52A thus subjected to image projection is defined as a light receiving range 53W. The range of the object thus projected within the light receiving range 53W on the finder field 56 of a variable finder 14 is defined as a distance measuring zone 57W. When the photographic lens 12 is a wide angle lens as in this case, a distance measuring frame 58 is formed so that the object within the distance measuring frame 58 formed on the finder field 56 of the variable power finder 12 is coincident with the object in a distance measuring zone 57W (FIG. 18A). Although the photographic lens 12 is a zoom lens capable of zooming so as to cover a range from wide angle to telephoto range, it will be described as a multi focal length lens having three focal lengths for convenience of illustration: at a wide angle, standard and telephoto positions.

Figure 17A:
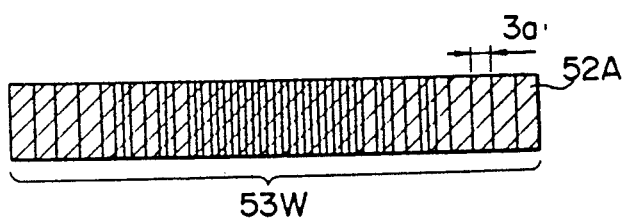
FIGS. 17A, 17B and 17C are elevational views of the light receiving ranges of the distance measuring sensor according to one feature of the present invention.
Figure 17B:
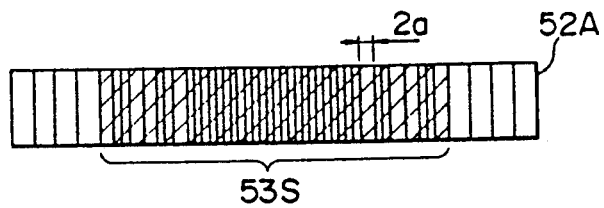

When the photographic lens 12 is adjusted to the standard condition by zooming, the object within the distance measuring frame 58 is projected to a light receiving range 53S as shown by planted lines in FIG. 17B. When the photographic lens 12 is further adjusted to the telephoto condition by zooming, the object within the distance measuring frame 58 is projected to a light receiving range 53T as shown by planted lines in FIG. 17C.

In this embodiment, distance measuring computations at a wide angle are carried out by utilizing the object image projected to the light receiving range 53W, i.e., using signal charges accumulated by all the light receiving elements of the line sensor 52A, whereas at standard time, distance measuring computations are carried out by using the light receiving elements within a smaller light receiving range 53S. Range-finding computations at the telephoto positions are further carried out by using the light receiving elements within a further smaller light receiving range 53T. In this way, the distance measuring zones 57W, 57S, 57T become coincident with the distance measuring frame 58, irrespective of the focal length of the photographic lens 12.

Figure 18B:
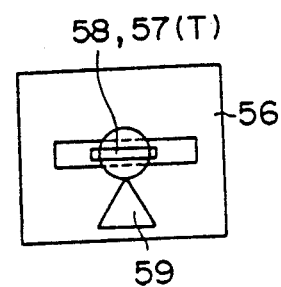

When one and the same object is photographed from the same range using the camera embodying the present invention, the distance measuring zone 57W is coincident with the distance measuring frame 58 at a wide angle as shown in FIG. 18A. When the photographic lens 12 at this camera position is zoomed out, the field magnification of the variable power finder 14 is raised as the focal length of the photographic lens 12 changes, whereby an object image 59 looks large as shown in FIG. 18B. As the size of the object image incident on the line sensor 52A via the AF lens 22 remains unchanged, the portion of the object incident on the line sensor 52A tends to become large as shown by an imaginary line of FIG. 18B, provided the whole line sensor 52A is used conventionally as before.

Figure 17C:
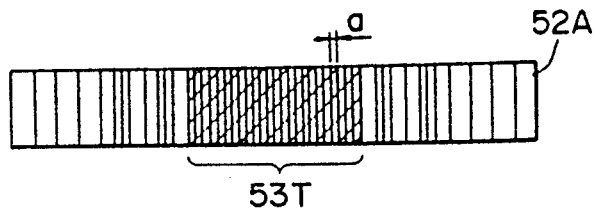

However, the portion of the line sensor 52A for use is restricted to the light receiving range 53T at the telephoto position as shown in FIG. 17C in this embodiment to make the size of the distance measuring zone 57T on the finder field 56 substantially as large as the distance measuring frame 58 at a wide angle likewise.

In this embodiment as stated above, the size of the distance measuring zone 57 on the finder field 56 is made constant, irrespective of the field magnification, by rendering the breadth of the line sensor 52 greater than before and selecting for use the light receiving portion of the line sensor 52 for distance measuring operations, in proportion to the field magnification of the variable power finder 14 and of the (focal length of the photographic lens 12) of the variable power finder 14. The distance measuring zone 57 thus becomes coincident with the distance measuring frame 58.

In other words, despite the alteration of the focal length and the field magnification, the light receiving elements (light receiving range) for use in the line sensors 52A, 52B are selected so that the distance measuring zone 57 and the distance measuring frame 58 on the object finder field 56 become coincident with each other.

In this embodiment further, the photographic lens 12 may a zoom lens, though it has been defined as a three focal length lens only to simplify the explanation thereof. When such a zoom lens is employed, the light receiving range is finely divided in accordance with the focal length.

A description will now be given of an arrangement of light receiving elements of the line sensors 52A, 52B and a mode in which the signal charges stored in these light receiving elements are read.

The line sensor 52 shown in FIGS. 17A, 17B, 17C comprises light receiving elements having three different breadths $a$, $2a$, $3a$. These light receiving elements are disposed symmetrically about an optical axis O with what has a breadth of a as a standard.

In this embodiment, the breadth of the light receiving range 53 at each focal length is set at ⅔ for the light receiving range 53S of the standard position and at ⅓ for the light receiving range 53T at the telephoto position, with the light receiving range 53W at a wide angle as the standard. In this case, 24 light receiving elements each $a$ in breadth are included in the light receiving range 53T for the telephoto position, whereas the light receiving elements $2a$ in breadth are provided outside those $a$ in breadth in the light receiving range 53S for the standard position. Consequently, the light receiving elements $a$ and $2a$ in a breadth of included therein are equivalent to breadths $48a$ in total. In addition, light receiving elements each $3a$ in breadth are provided outside those $a$, $2a$ in breadth in the line sensor 52W within the light receiving range at a wide angle position. The light receiving elements $a$, $2a$, $3a$ in breadth included therein are therefore equivalent to $72a$ breadths in total.

The light receiving breadths are changed at the ratio stated above to process the output of the line sensor 52 as a 24-bit signal, irrespective of the light receiving range. In other words, a bit equivalent to the breadth $a$ is processed as one bit at the telephoto position; a bit equivalent to the breadth $2a$ is processed as one bit at the standard position; and the light receiving element equivalent to the breadth $3a$ is processed as one bit at a wide angle position.

Figure 19A:
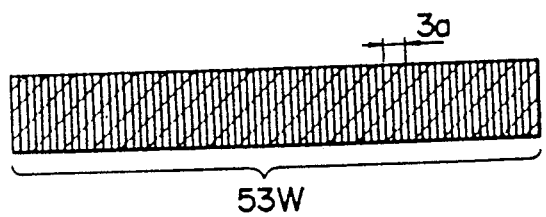
FIGS. 19A, 19B, 19C and 20A, 20B, 20C are diagrams illustrating light receiving ranges in conformity with the construction and focal length of the lens first and second modifications of distance measuring sensors, respectively.
Figure 19B:
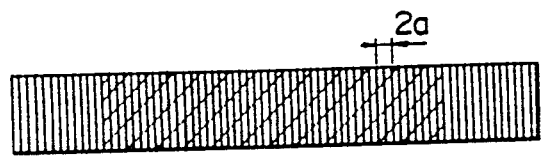
Figure 19C:
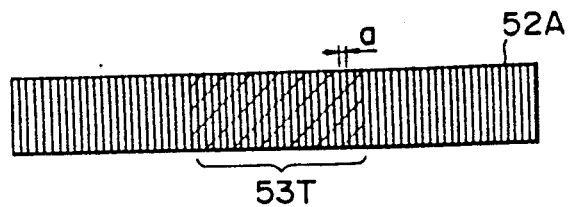

FIGS. 19A, 19B, 19C show a first modification of the line sensor 52. In this modification, there are formed 72 light receiving elements each $a$ in breadth and the light receiving ranges at the respective focal lengths are similar to those shown in FIG. 17. Likewise, these light receiving elements are processed as 24-bit data at the respective focal lengths. In other words, 24 light receiving elements are processed as one bit at the telephoto position, respectively; the adjoining two light receiving elements are combined before being processed as one bit at the standard position, and the adjoining three light receiving elements are combined before being processed as one bit at a wide angle position.

Figure 20A:
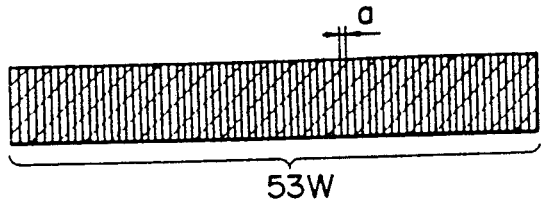
Figure 20B:
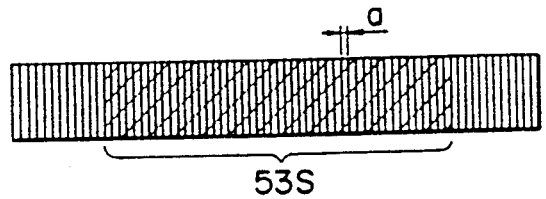
Figure 20C:
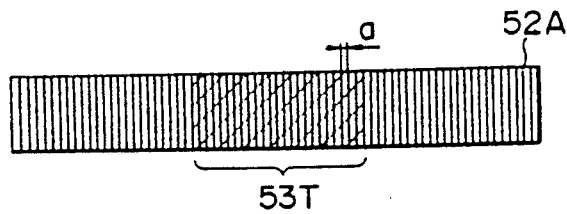

FIGS. 20A, 20B, 20C show second modification of the line sensor 52. The arrangement of light receiving elements in this second modification is similar to that shown in FIG. 19. Although the light receiving ranges at the respective focal lengths are similar to those shown in the first modification, bit processing differs. In this modification, each light receiving element is processed as one bit; in other words, it is processed as 24-bit data at the telephoto position, as 48-bit data at the standard position, and as 72-bit data at a wide angle position.

However, the number of light receiving elements is limited to what has been defined in the embodiments above. Moreover, the number of light receiving range may be altered as desired with one bit as a minimum unit, depending on the focal length.

A description will now be given of a second embodiment of the present invention for solving problems resulting from parallax due to the fact that the optical axis of the distance measuring device is in spaced from that of the photographic lens with reference to FIGS. 21 through 25.

Figure 8A:
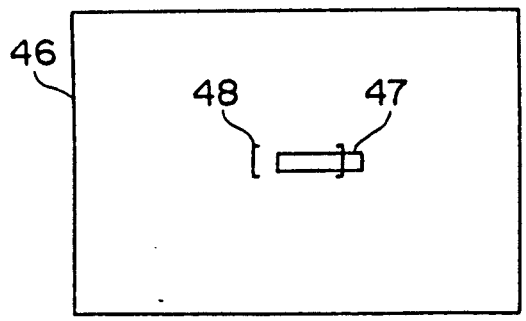
Figure 8B:
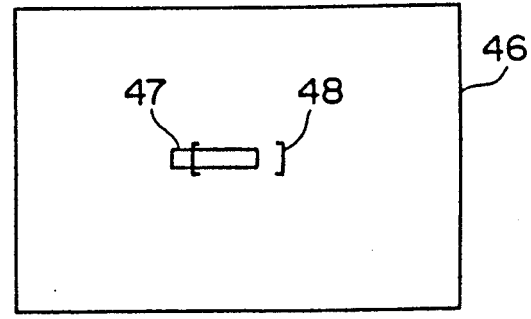
Figure 12A:
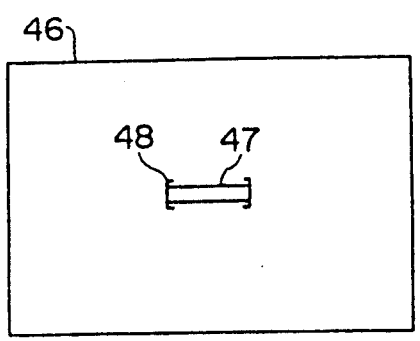
Figure 12B:
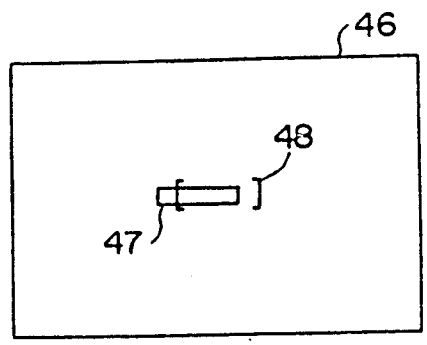
Figure 13:
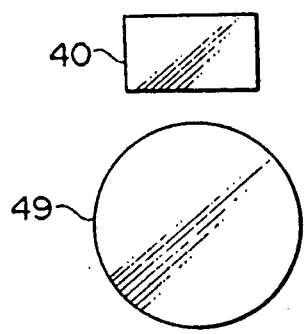
Figure 14A:
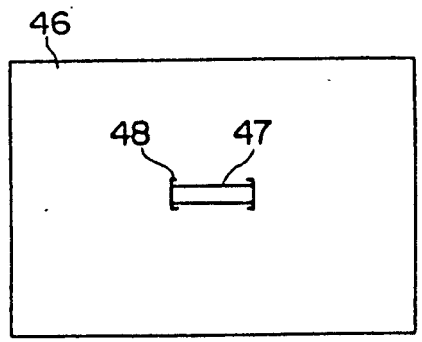
Figure 14B:
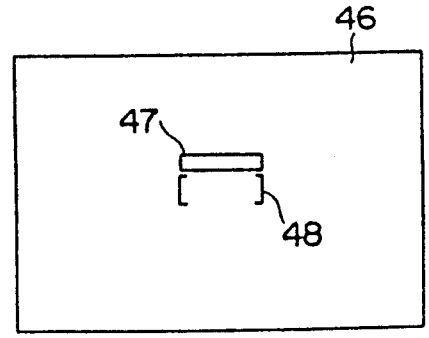

A description will first be given of the second embodiment applied to a camera comprising AF lenses 61, 62 of a distance measuring device and a variable power finder 60, which are provided substantially in a horizontal row, and a photographic lens 63 disposed under the variable power finder 60 with reference to FIGS. 21 through 24. With this arrangement, an object image 65 projected by the AF lenses 61, 62 onto a line sensor is transversely moved in proportion to the object distance. For this reason, the distance measuring zone relative to distance measuring frame 68 on an object field 66 is transversely shifted because of the object distance as shown in FIGS. 8A, 8B.

Like the line sensor 52 shown in FIG. 16, the line sensor 64 is therefore formed longer in the transverse direction in this embodiment, irrespective of the object distance, so that an object image 65 is received by light receiving elements of the line sensor 64. As shown by slanted lines in FIGS. 22A through 22C, 23A through 23C, and 24A through 24C, the light receiving range, i.e., the range of the light receiving elements for use is changed in proportion to the object distance.

With this arrangement, the shifting of the distance measuring zone 67 from the distance measuring frame 68 is decreased, irrespective of the object distance. FIGS. 22, 23 and 24 designate modes for a wide angle, standard and telephoto position, respectively.

In this camera, the optical axis of the variable power finder 60 is caused to swing toward the optical axis of the photographic lens 63 (downward in the drawing) in macrophotography to decrease the parallax of the photographic lens 63 from the variable power finder 60 in macrophotography. As a result, the distance measuring zone 67 on the finder field tends to shift upward in macrophotography (FIG. 21D).

Figure 15:
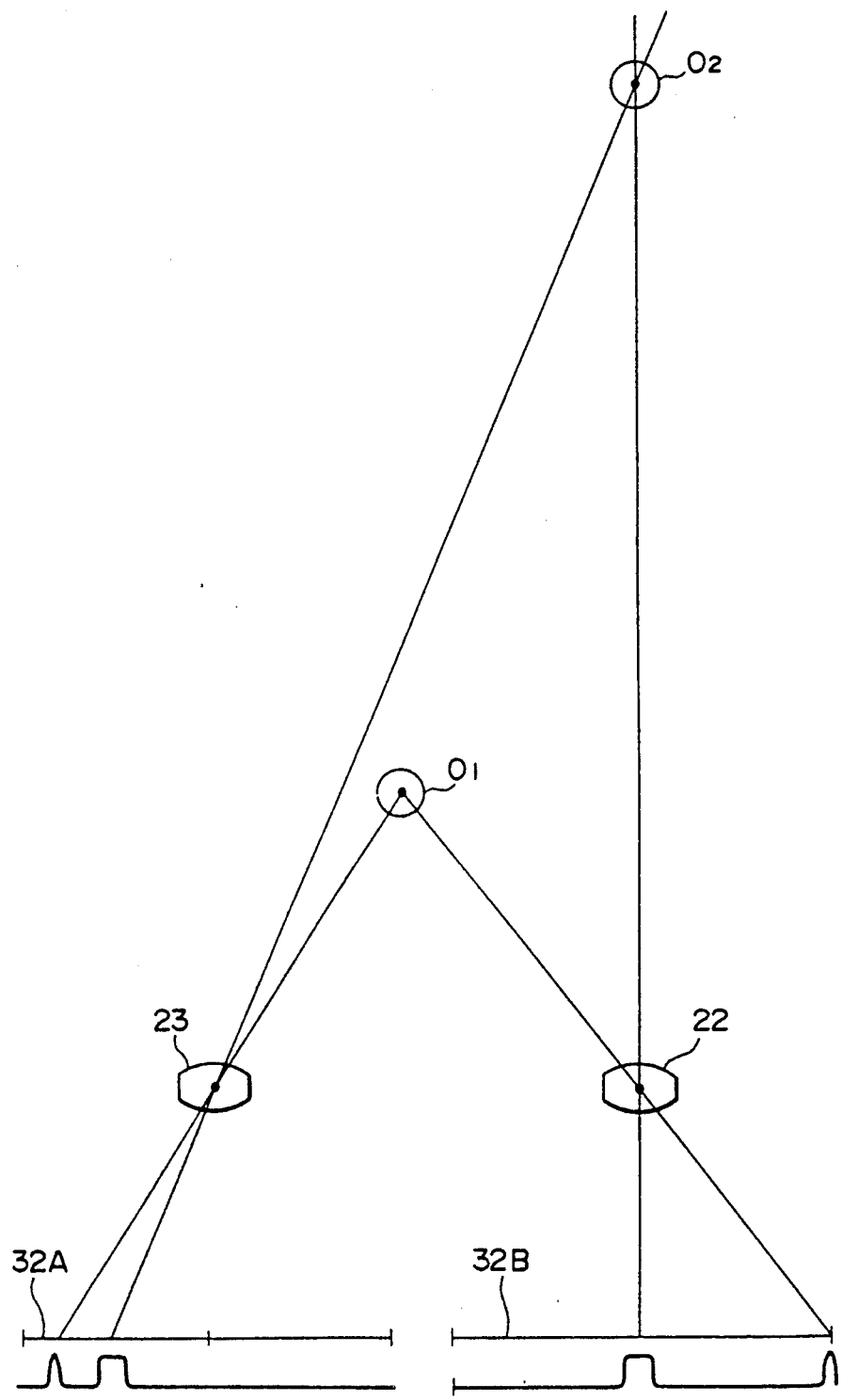
FIG. 15 is a diagram illustrating problems posed by a three-dimensional object.
Figure 21A:
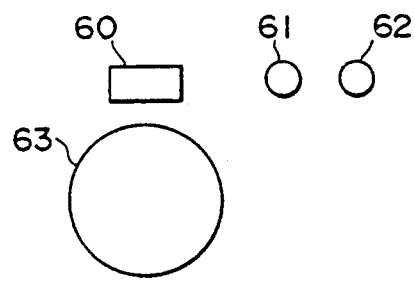
FIGS. 21A, 21B, 21C, 21D are diagrams illustrating a second embodiment for solving problems caused by parallax due to different object distances due to parallax.
Figure 21B:
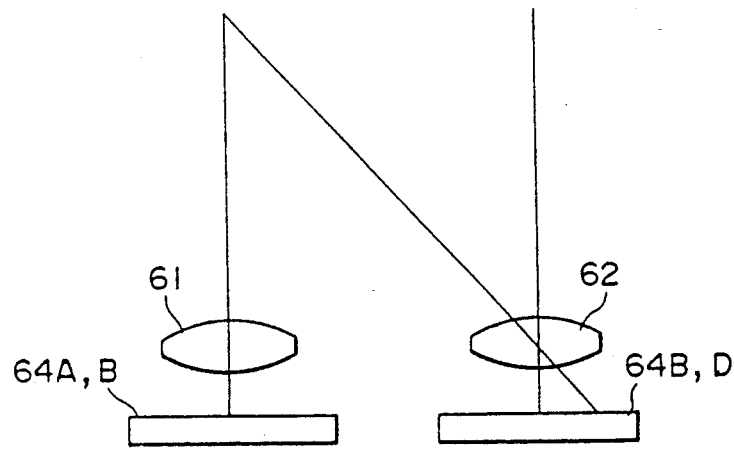
Figure 21C:
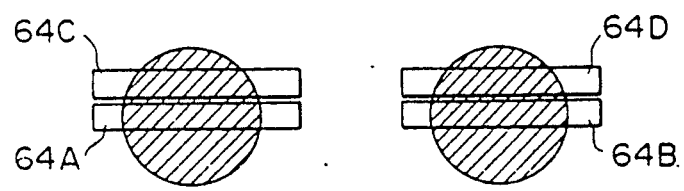
Figure 21D:
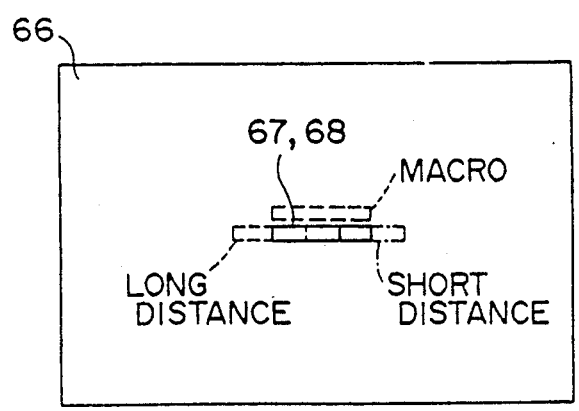
Figure 22A:
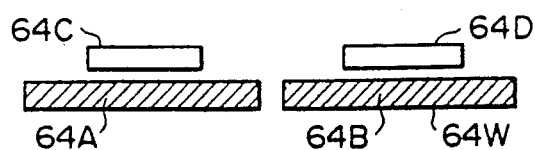
FIGS. 22A, 22B, 22C, 23A, 23B, 23C and 24A, 24B, 24C are diagrams illustrating light receiving ranges of the line sensor in proportion to object distances at a wide angle, standard and telephoto positions, respectively.
Figure 22B:
Figure 22C:
Figure 22D:
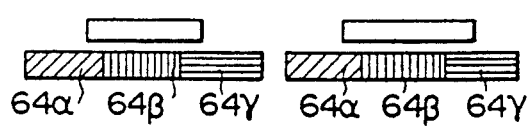
FIGS. 22D, 23D, 24D are diagrams illustrating divided forms of the line sensor at divided distance measuring time.
Figure 23A:
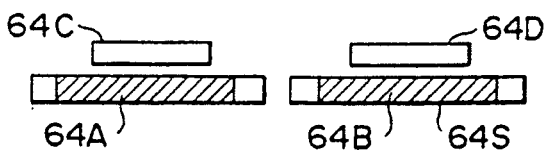
Figure 23B:
Figure 23C:
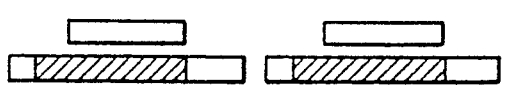
Figure 23D:
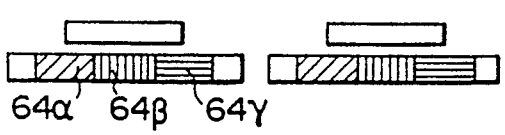
Figure 24A:
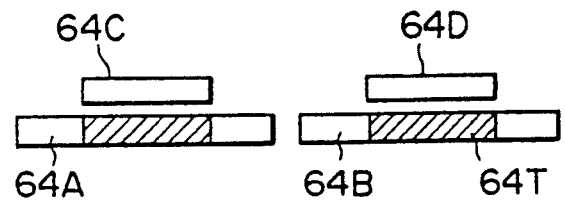
Figure 24B:
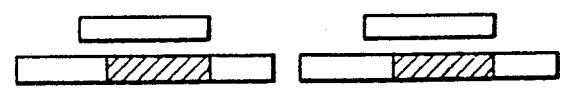
Figure 24C:
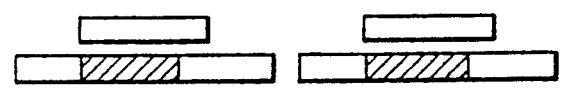
Figure 24D:
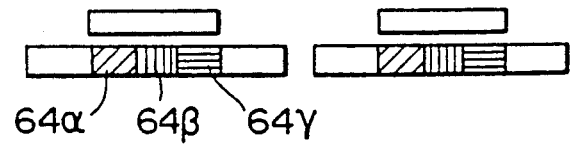
Figure 25A:
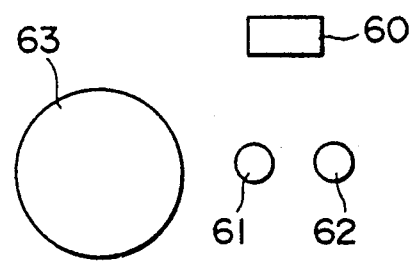
FIGS. 25A, 25B, 25C, 25D are diagrams illustrating a third embodiment for solving problems caused by parallax due to different object distances.
Figure 25B:
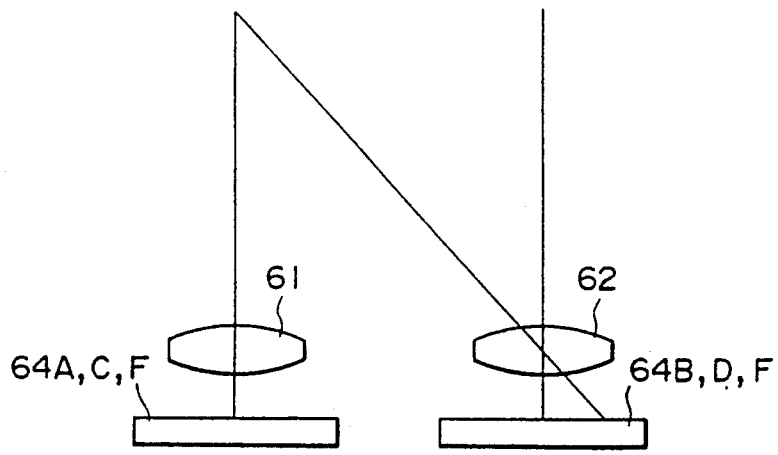
Figure 25C:
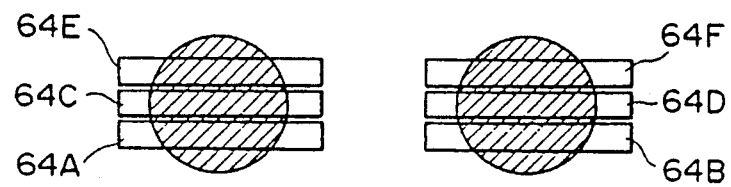
Figure 25D:
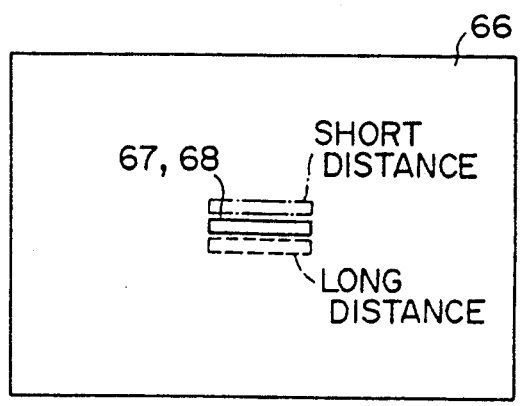

In this embodiment, line sensors 64C, 64D for use in macrophotography are therefore provided above line sensors 64A, 64B for use in normal photography (FIG. 21c). The lower line sensors 64A, 64B for normal use are employed in normal photography, whereas the upper line sensors 64C, 64D for macro use are employed in macrophotography for distance measuring purposes. With this arrangement, the parallax is corrected to make the distance measuring frame 68 and the actual distance measuring zone 67 on the finder field coincident with each other. In the above-described camera, moreover, distance measuring is carried out using the light receiving elements at the widest range at each focal length of the photographic lens as the object distance remains unknown at the time of initial distance measuring. When the object is a three-dimensional object, there appear a plurality of output peaks of light receiving elements (FIG. 15). As a result, their distances become impossible to measure and it is otherwise not known which one of the objects is to be utilized for distance measuring.

In this embodiment, the light receiving range is therefore divided into three sections (FIGS. 22D, 23D, 24D) and the ranges of the objects projected to the light receiving ranges 64α, 64β, 64τ are found, respectively. The number of divisions of the light receiving ranges and their sizes are optional and the divided light receiving areas can also be utilized in a normal (i.e., non-three dimensional object) distance measuring operation as set out above, wherein the distance measuring is only executed once.

FIG. 25 shows the arrangement of the optical system of a third embodiment of the present invention. In this embodiment, the finder 60 and the AF lenses 61, 62 of the AF optical system are vertically disposed and these are further disposed next to the photographic lens 63 that is utilized for zooming purposes.

In this third embodiment, the variable power finder 60 is shifted from the optical axes of the AF optical systems 61, 62 and the distance measuring frame 68 is mainly vertically shifted from the distance measuring zone 67 on the finder field 66, depending on the object distance in normal photography. Since the optical axis of the variable power finder 60 swings in the direction of the optical axis of the photographic lens 63 during macrophotography, the distance measuring zone 67 shifts diagonally with respect to the distance measuring frame 68.

In this embodiment, the line sensors 64 are therefore vertically provided in three rows. The lowermost line sensors 64A, 64B are used for a short distance; middle line sensors 64C, 64D for an intermediate distance; and the uppermost line sensors 64E, 64F for a long distance and macro. Each of the line sensors 64 is transversely longer than the conventional one as in the case of the embodiment of FIG. 16.

In this embodiment, the lines sensors 64C, 64D for an intermediate distance are used first in normal photography to measure the object distance. Then a selection is made to determine which one of the line sensors 64 should be used on the basis of the range measured. The line sensor 64 thus selected is used to perform the distance measuring operations again in order to drive a focusing lens up to the focusing position based on the range measured.

Through the aforementioned operations, the parallax between the distance measuring zone 67 and the distance measuring frame 68 resulting from the difference in object distance is corrected, whereby the distance measuring zone 67 becomes coincident with the distance measuring frame 68 on the finder field, irrespective of the object distance. As a result, the object intended for photography by a photographer is accurately focused. In this case, divided distance measuring is applied to a three-dimensional object even in this embodiment.

Since the variable power finder 60 is caused to swing toward the optical axis of the photographic lens 63 during macrophotography in this camera, the distance measuring zone 67 moves upward with respect to the distance measuring frame 68 on the finder field 66. The line sensors 64E, 64F for a long distance and macro are selected during macrophotography in this embodiment. Consequently, the parallax is corrected as the optical axis of the variable power finder 60 swings, whereby the distance measuring frame 68 becomes coincident with the distance measuring zone 67 on the finder field 66.

A description will now be given of a reader for reading data relating to the focal length of the photographic lens 12 in order to select the line sensor 64 for use in accordance with the focal length with reference to FIG. 26.

Figure 26:
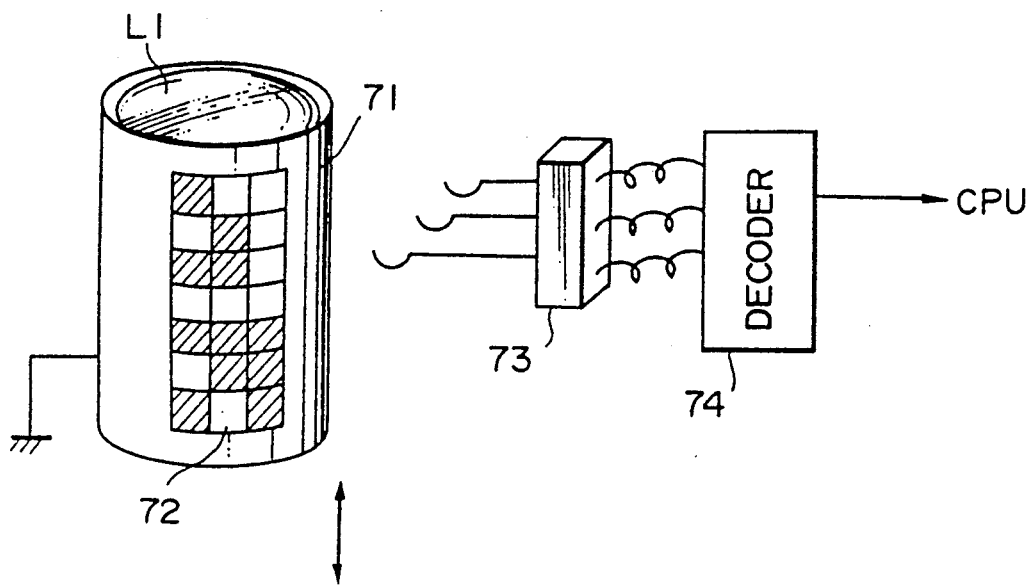
FIG. 26 is a schematic perspective view of a photographic range data reader.

The photographic lens 12 zooms in conformity with the relative reciprocative movement of a vari-focal lens L1 (FIG. 26). A code plate 72 is stuck to the surface of a zoom cylinder 71 for reciprocating a group of varifocal lenses L1. As the cylinder moves straight, the code plate in the direction of the two-headed arrow displays the position of the zoom cylinder 71 in the form of a code. The code plate 71 is formed with 3-bit codes, each being a combination of conducting and insulating units.

Figure 28B:
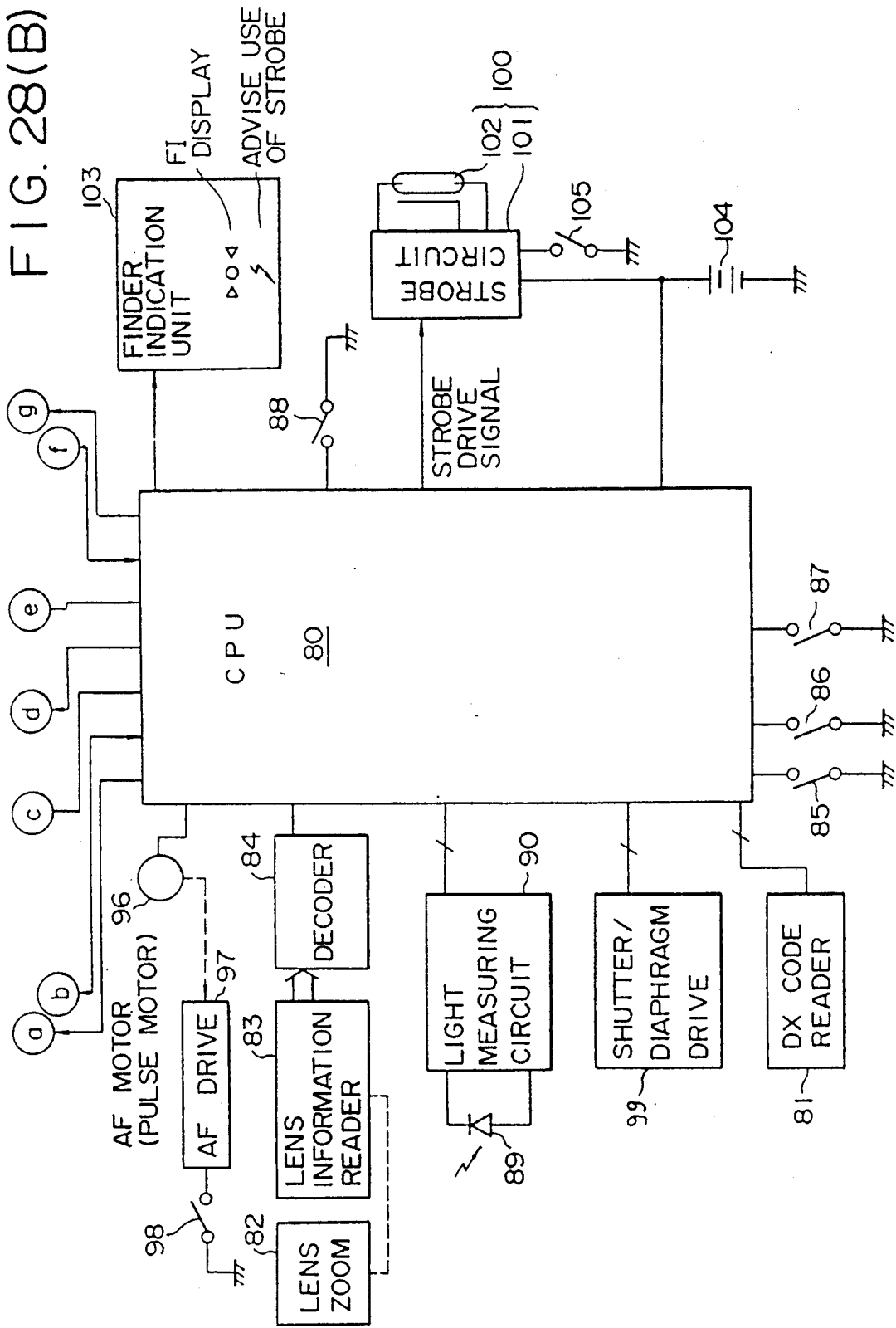
FIG. 28 illustrates the relationship of the block diagrams of FIGS. 28(A) and 28(B)

Each code on the code plate 72 is read by a brush 73 provided with a contact 73a which slidingly contacts the bits of each code. The code read thereby is decoded by a decoder 74 before being sent to a CPU 80 (FIG. 28B).

The CPU 80 contains in the memory thereof focal length data corresponding to each code of the code plate 72 and data on the range of use of the line sensor in conformity with each focal length. The CPU 80 determines the range of use of the line sensor 64 according to the data (focal length) delivered from the decoder 74.

Figure 27:
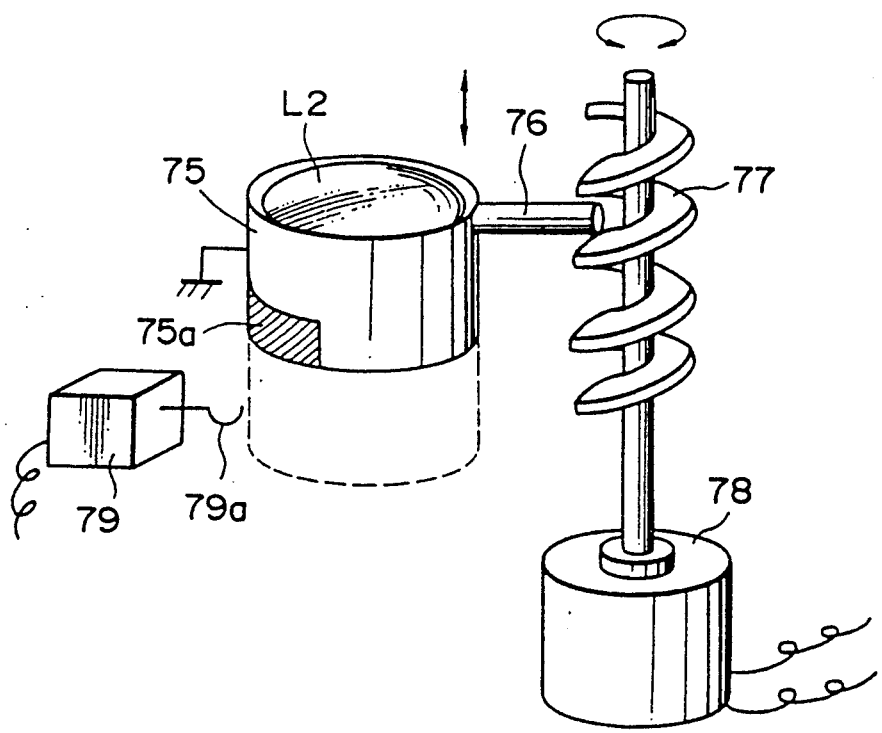
FIG. 27 is a schematic perspective view of a focal point regulator.

With reference to FIG. 27, the focusing system of the camera will subsequently be described. Focusing is regulated as a lens cylinder 75 holding a focusing lens L2 moves in the direction of the optical axis. A pin 76 projects from the lens cylinder 75 and also engages with a screw 77 arranged parallel to the optical axis of the lens. The screw 77 is driven to rotate by a focusing motor 78. As the focusing motor 78 rotates, the lens cylinder 75 reciprocates to regulate the focal point. In this case, the direction and amount of rotation of the focusing motor 78 are controlled by the CPU 80.

A conductive plate 75a is stuck to the rear end portion of the lens cylinder 75 and a switch 79 having a contact 79a which the conductive plate 75a is disposed behind the conductive plate 75a. In this way, the contact 79a contacts the conductive plate 75a to turn on the switch when the lens cylinder 75 is located within the fixed range of movement, whereas when the lens cylinder 75 advances beyond a predetermined position, the contact 79a is detached from the conductive plate 75a to turn it off. The switch 79 is used to detect whether the lens cylinder 75 is located in a standard position.

Figure 6A:
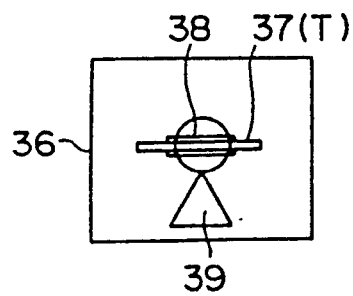
Figure 6B:
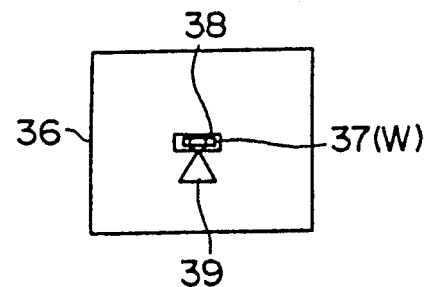
Figure 7:
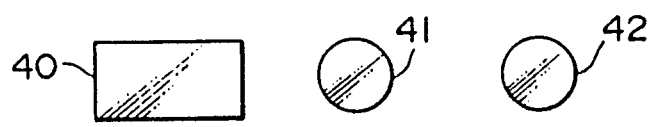

A description will now be given of a control system configuration of a camera to which the embodiment shown in FIG. 6 is applied with reference to FIG. 28. This camera is a lens-shutter type camera equipped with a distance measuring device, a power zoom lens and a pop-up strobe.

The CPU 80 collectively controls control operations of the camera relating to distance measuring, metering, exposure and the like. The CPU 80 performs each control operation in accordance with the programs stored in its internal memory.

When a film is loaded, the CPU 80 reads the film sensitivity data via a DX code reading means 81 and stores the data in an internal RAM as the ISO speed data of the film.

The CPU 80 further reads the focal length data of a photographic lens 82 (12) and data on whether macro is employed and stores the data. These operations are performed via a focal length data reader 83 and a decoder 84 configured in a manner similar to what is shown in FIG. 26. Based on the focal length data and the like, the CPU 80 selects the light receiving range of the line sensor 64 and the line sensor 64 for use.

There are also provided switches for actuating the CPU 80, including a metering switch 85, a release switch 86, a macro switch 87, and a strobe pop-up switch 88. When the metering switch 85 is turned on, metering and AF operations are performed and when the release switch 86 is turned on, an exposure operation is performed. The macro switch 87 is turned on when the photographic lens 82 moves to a macro area. When the strobe pop-up switch 88 is turned on, a built-in strobe is popped up to make the strobe ready for light emission.

In the metering operation, a metering circuit 90 submits the signal produced by a metering light receiving element 89 that has received object light to predetermined processes such as logarithmic compression and feeds the result to the CPU 80. The CPU 80 performs metering operations using the film ISO speed data stored in the memory according to the metering signal and determines a diaphragm value and a shutter speed.

In the distance measuring operation, the line sensors 64 using switch circuits 91, 92 are actuated and the line sensors for use are selected. Then the line sensors 64 are caused to start accumulating signal charges.

After the lapse of predetermined time, the line sensors 64 are caused to stop to accumulating the charges, which are read as electric signals. A monitor circuit shown in FIG. 31A, for instance, determines the timing at which the charge accumulation is suspended.

The accumulated signals read from the line sensors 64 are supplied via the switch circuits 91, 92 to A/D converters 93, 94, respectively. The signals thus supplied thereto are converted to predetermined respective digital signals with a predetermined light receiving element unit and supplied to the CPU 80. The CPU 80 is not designed to subject all the accumulated signals to A/D conversion and to read the resulting signals but to subject to A/D conversion only the signals accumulated by the light receiving elements within the light receiving range selected in accordance with the focal length of the photographic lens 82 and to read simultaneously and store the resulting signals. Accumulation control, reading, A/D conversion and the like are exercised on the basis of the pulse generated by a clock generator 95.

The CPU 80 treats the signals read from a pair of line sensors 64 selected and stored as standard and reference signals respectively and performs operations to obtain an object distance. Based on the object distance, the CPU 80 starts an AF motor 96 (78) and drives the focusing lens L2 up to a focusing position via a lens drive 97. Numeral 98 denotes a position detecting switch for detecting a standard position of the lens drive 97.

In the exposure operation, the diaphragm is contracted up to the set diaphragm value via a shutter drive circuit 99 according to the predetermined diaphragm value and the shutter speed and opens or closes the shutter at the set shutter speed to expose the film.

When the exposure is terminated, one frame of the film is wound up by an auto winder (not shown) to charge the shutter. The film may be wound up manually.

Further, a built-in pop-up strobe 100 is provided in this embodiment. The pop-up strobe 100 is provided with a light emitting circuit 101 and a light emitting unit 102 detachably fitted to the camera body.

In the metering operation stated above, an in-finder indication unit 103 provided on the finder field is flickered to call attention to the use of the strobe when the object luminance is judged lower than a predetermined value. The in-finder indication unit 103 is also capable of displaying a focused state.

When the strobe pop-up switch 88 is turned on, the light emitting unit 102 projects to set up a condition in which light can be emitted. When the release switch 86 is turned in this condition, the light emitting unit 102 emits light at predetermined timing.

Numeral 104 in FIG. 28 denotes a battery for supplying power to the CPU 80, the pop-up strobe 100 and the like, whereas 105 denotes an X contact switch for compelling the light emitting unit 102 to emit light and it is turned on/off interlockingly with the shutter drive circuit 99.

A description will subsequently be given of the operation of reading the signal charge from the line sensor 64 with reference to FIG. 29. The line sensors 64A–64D are provided on one IC (Integrated Circuit) board. The pair of line sensors 64A, 64B and the other pair of line sensors 64C, 64D are formed in a transverse row, and the line sensors 64 in the respective pairs are disposed vertically in parallel to each other. The luminous flux of the object passed through the AF lenses 61, 62 is projected onto the separated area of the line sensor 64, i.e., the line sensors 64A, 64C on the left-hand side and the line sensors 64B, 64D on the right-hand side, and converted by the respective light receiving elements into signal charges. The signal charges accumulated by the respective light receiving elements of the line sensor 64 are transferred to a horizontal transfer unit on the board of predetermined intervals.

This horizontal transfer unit is provided in each line sensor 64 and a pair of read transfer units are provided outside the horizontal transfer unit. With respect to the signal charges transferred to the read transfer units, the signal charges in the left-hand line sensors 64A, 64C are transferred to the left-hand read transfer unit in steps and alternately read one at a time from the read end of the read transfer unit, whereas the signal charges stored in the right-hand read transfer unit are also alternately read one at a time from the end of the right-hand read transfer unit. Since the operation of the each line sensor is similar to that of another, the operation of the line sensors 64B, 64D on one side will be described.

The clock generator 95 under the control of the CPU 80 transfers the signal charges accumulated by the respective light receiving elements of the line sensor 64 to the horizontal transfer units at a time and outputs an accumulation control signal $\phi T$ for stopping the accumulation of the signal charges and a read pulse for use in reading the signal charges transferred to the horizontal transfer units in sequence. The pulse generated by the clock generator 95 is supplied to not only the line sensor 64 but also a counter 106 and the A/D converter circuit 94.

The CPU 80 sets a count to a count setter 107 in accordance with the range of use of the line sensor 64 for fetching the signal charge. The count setter 107 supplies the set value to a count comparator 108. On the other hand, the counter 106 counts the number of read pulses generated by the clock generator 95 and supplies the count to the counter comparator 108. The counter comparator 108 compares the set value with the count and supplies a coincident signal to the CPU 80 only when both coincide with each other.

Upon receipt of the coincident signal, the CPU 80 converts the signal supplied from the line sensor 64 via the switch circuit 92 to a discharge signal by operating the A/D converter 94. The switch circuit 92 is used for alternatively connecting the read terminals of the line sensors 64B, 64D to the A/D converter 94 and the switching operations are controlled by the CPU 80.

A description will be given of the aforementioned operations after the termination of charge accumulation on the part of the line sensor 64. An accumulation control signal is produced from the clock generator 95 and when the charge accumulation is completed by transferring the electric charges in the respective light receiving elements of the line sensor 64 to the horizontal transfer units at a time, the CPU 80 causes the clock generator 95 to output the read pulse. On the other hand, the CPU 80 selects which one of the light receiving ranges of the line sensor 64 is to be utilized on the basis of the focal length data of the photographic lens 82 supplied by the decoder 84 and the data derived from the macro switch 87 and sets the value obtained from the counter setter 107 and further selects either of the contacts of the switches 91, 92. In this case, it is assumed that the line sensor 64B and the telephoto light receiving range 64T in normal photography.

The clock generator 95 outputs the read pulses with a predetermined period, whereby the signal charges accumulated by the respective light receiving elements of the line sensor 64 are supplied to the switch circuit 92 as electric signals with a predetermined period. However, because no coincident signal is delivered from the count comparator 108 unit the change signal of the light receiving range 64T is supplied, the CPU 80 fetches no signal. The comparator circuit 108 compares the set value supplied by the count setter 107 with the number of read pulses generated by the counter 106 and outputs a coincident signal when both coincide with each other.

The CPU 80 fetches the signal produced by the line sensor 64 by starting the A/D converter 94 when detecting the delivery of the coincident signal and stores the signal in a storage memory area thereof. Each of the light receiving elements (bits) is responsible for the aforementioned process. When the signals from two or three light receiving elements are added and processed with one bit at the standard or telephoto time, the signals delivered by the two or three light receiving elements are subjected to A/D conversion in the A/D converter circuit 94 and added up in the CPU 80 before being stored in the RAM.

In this embodiment, the signals produced from the pair of line sensors on both sides are fetched by the CPU 80 via the read pulse and a data bus for common use. Consequently, signal data 1 on one side and signal data 2 on the other can alternately be loaded on the data bus by changing the timing of a transfer signal.

When the first round of the signals accumulated in the line sensors 64A, 64B are read and stored completely, the CPU 80 performs predetermined distance measuring operations according to the data thus stored to obtain the object distance. Then the CPU 80 selects the light receiving range proportional to the object distance, resets the count to the counter setter 107, and starts reading the signals accumulated in the line sensors 64A, 64B.

When the operation of reading and storing the signals, the CPU 80 performs the predetermined distance measuring operations according to the stored data to obtain the object distance, starts the focusing motor 96 (78) according to the value thus obtained, and drives the focusing lens L2 up to the focusing position.

Each of the aforementioned operations is performed by the CPU 80 in accordance with the program stored in its ROM.

A description will subsequently be given of a configuration of a circuit for controlling signal charge accumulation time of the line sensor 64 with reference to FIG. 31A.

A monitor sensor 110 is provided near the line sensor 64A. The monitor sensor 110 measures the amount of light incident on the line sensor 64 and controls the charge accumulation time of the line sensor 64 to make the time optimal.

The monitor is divided into sections which correspond to the light receiving ranges 64T, 64S, 64W of the line sensor 64 for use: namely, a central section 110A; intermediate sections 110B, 110B on both sides thereof; and exterior sections 110C, 110C on both sides of the respective intermediate sections. Only the central section 110A is used at the telephoto position; the central section 110A and the intermediate sections 110B, 110B are used at standard position; and all of the sections 110A, 110B, 110C are used at a wide angle position.

The outputs of the sections of the monitor sensor 110 are connected to inverted input terminals of respective comparators 111, 112, 113. Reference voltages Vr1, Vr2, Vr3 are applied to the inverted input terminals of the respective comparators 111, 112, 113. When the output level of the line sensor 64 lowers up to a predetermined value, the output of the comparator becomes "H" (High).

The outputs of the comparators 111, 112, 113 are connected to the one-side inputs of respective AND gates 114, 115, 116. Output terminals A, B, C of an output switch circuit 117 are connected to the-other-side inputs of the respective AND gates 114, 115, 116. While the output of the output switch circuit 117 remains at "H", the outputs of the AND gates 114, 115, 116 change from "L" (Low) to "H" when the output of the line sensor 64 changes to "H."

The outputs of the AND gates 114, 115, 116 are connected to the input of an OR gate 118. The output of the OR gate 118 consequently changes from "L" to "H" when any one of the outputs of the AND gates changes to "H."

The output of the OR gate 118 is applied to a $\phi T$ generator 119 (in phase with clock generator 95). The $\phi T$ generator 119 outputs an accumulation control signal $\phi T$ for stopping the line sensor 64 from accumulating electric charges when the output of the OR gate 118 changes to "H." When the accumulation control signal $\phi T$ is produced, the line sensor 64 transfers the signal charges accumulated by the light receiving elements to the horizontal transfer units at a time to terminate the accumulation of signal charges.

The operation of the electric charge accumulation circuit thus arranged will be described with reference to FIG. 31B. When an object image is projected on the monitor sensor 110, the output potential of the monitor sensor 110 begins to drop. The dropping speed is proportional to the brightness of the object thus projected.

In other words, the brighter the object is, the faster the output potential drops, whereas the darker the object, the slower the potential drops. When that potential becomes equal to the potential (Vr) of the non-inverted input terminal, the outputs of the comparators 111, 112, 113 change to "H."

On the other hand, a predetermined reference voltage Vr is kept being applied to the non-inverted input terminals of the comparators 111, 112, 113. When the divided sections 110A, 110B, 110C become equal to the reference voltage, the outputs of the comparators 111, 112, 113 to which the outputs of the divided sections 110A, 110B, 110C have been applied change to "H."

All or one of the output terminals A, B, C of the output switch circuit 117 is set to "H" by the CPU 80 in proportion to the focal length of the photographic lens. In this embodiment, the output terminals A, B and C are set to "H" at a wide angle; the output terminals A and B are set to "H" at standard time; and only A is set to "H" at telephoto time. As a result, if the corresponding output terminal A, B or C remains at "H" when the output of any one of the comparators 111, 112, 113 becomes "H", the outputs of the AND gates 114, 115, 116 become "H" and the output of the OR gate 118 also becomes "H", whereby the accumulation control signal $\phi T$ is delivered from the $\phi T$ generator 119 to make the line sensor 64 terminate the accumulation of electric charges. Although it is preferred to arrange the monitor sensor 110 in conformity with the light receiving range, it may be left undivided.

With the above-described operations, optimum electric charge accumulation time corresponding to the object luminance is obtained. The reference voltage Vr is determined in conformity with various conditions such as standards of line sensor and the monitor sensor, the area of the divided monitor sensor and the like. In this case, the CPU 80 outputs a signal for causing the accumulation control signal $\phi T$ to be produced after the lapse of predetermined time even though the output potential of the monitor sensor does not drop up the reference voltage.

A description will subsequently be given of the operational sequence of the camera having the circuit configuration stated above with reference to FIGS. 32, 33. These operations are performed by the CPU 80 in accordance with the programs stored in the internal memory of the CPU 80.

When the power supply it turned on, the main routine shown in FIG. 32 is entered first.

In the main routine, a decision is made on whether or not the metering switch 85 has been turned on and if it has not been turned on, the operation is repeated until it is turned on (S11).

When the metering switch 85 is turned on, the metering circuit 90 is started to begin metering (S13). Then the switching conditions of the macro switch 87 and the strobe pop-up switch 88 are checked (S15). Further, metering operations are performed according to the metering signal from the metering circuit 90 (S17).

The CPU 80 receives the focal length data of the photographic lens 82, selects the light receiving range of the line sensor 64 for use on the basis of the focal length data, causing the line sensor 64 to accumulate signal charges thereby, performs distance measuring operations by reading the A/D converted signal, and performs the AF process for driving the focusing lens L2 up to the focusing position via the AF motor 96 according to the value obtained from the distance measuring operations (S19).

On terminating the AF process, the CPU 80 performs a display process for causing the in-finder display unit to display a focused state or what is for calling attention to the use of the strobe provided the object luminance indicates a value for calling attention to the use of the strobe during the luminance operations (S21).

The CPU 80 then checks whether or not the release switch 86 has been turned on and if it has not been turned on, returns to S11 to repeat the aforementioned process, whereas if the release switch 86 has been turned on, the CPU 80 performs the exposure process by driving the shutter drive circuit 99 and then returns to S11 (S23).

The basic operation of the camera has been described above.

A description will further be given of the AF process for use when a three-dimensional object is photographed. In this embodiment, an object at the shortest distance is focused when it is judged a three-dimensional one as a result of division distance measuring. When a strobe is employed, an object at the shortest distance is focused within the possible appropriate irradiation range of the strobe.

The operation stated above will be described with reference to FIG. 33 showing the AF subroutine (S19) of FIG. 32. When the subroutine is entered, CPU 80 receives data of the photographic lens 82 (data of focal length and that of macro switch 87) to make a decision on whether it is macro.

If it is not macro, the CPU 80 selects the line sensors 64A, 64B and also the range of use (FIGS. 22A, 23A, 24A), depending on the focal length. Then CPU 80 reads the signals of the line sensor 64 accumulated within the range of use and performs distance measuring operations (S37, S39).

The CPU 80 makes a decision on whether the object is a three-dimensional one from the results of distance measuring operations and if it is not a three-dimensional object, selects the light receiving ranges 64S, T, W according to the computed distance measuring value (S41, S43, FIGS. 22A through 22C, FIGS. 23A through 23C, FIGS. 24A through 24C). The CPU 80 reads the signals accumulated by the light receiving elements of the line sensors 64A, 64B conforming the conditions thus selected for storage and then performs distance measuring operations after storing all the signals (S43, S45).

The CPU 80 makes a decision on whether the strobe is to be used from the on/off condition of the strobe pop-up switch 88 and if it is not to be used, drives the AF motor 96 according to the computed distance measuring value and returns to the main routine after driving the focusing lens L2 up to the focused position (S47, S49).

When the photographic lens 82 is macro, the CPU 80 proceeds to S51 from S33 where whether or not macro is determined and selects the line sensors 64C, 64D for macro. The CPU 80 then reads the signals accumulated by the line sensors 64C, 64D and performs distance measuring operations (S53, S55). Further, the CPU 80 drives the focusing lens L2 up to the focusing position via the AF motor 96 according to the computed distance measuring value and returns to the main routine (S49).

When the object is not macro but a three-dimensional one, the CPU 80 proceeds from S41 to S57 and selects the divided light receiving ranges $64\alpha$, $64\beta$, $64\tau$ (FIGS. 22D, 23D, 24D) for the three-dimensional object. Based on the signal at each light receiving range, the CPU 80 performs the respective distance measuring operations, i.e., divided distance measuring operations and selects the computed value at the shortest distance among them (distance measuring object distances) before proceeding to S47 (S59).

Figure 1:
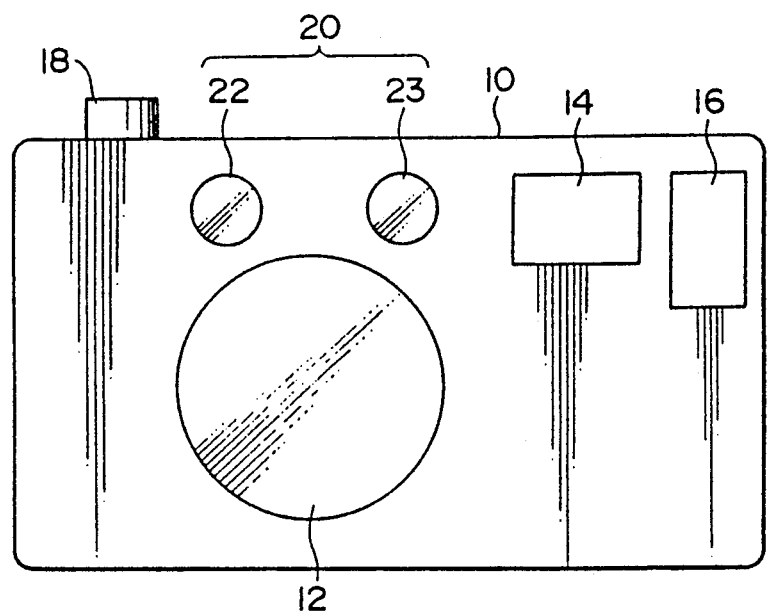
FIG. 1 is a front elevational view of a camera equipped with a passive distance measuring device.
Figure 2:
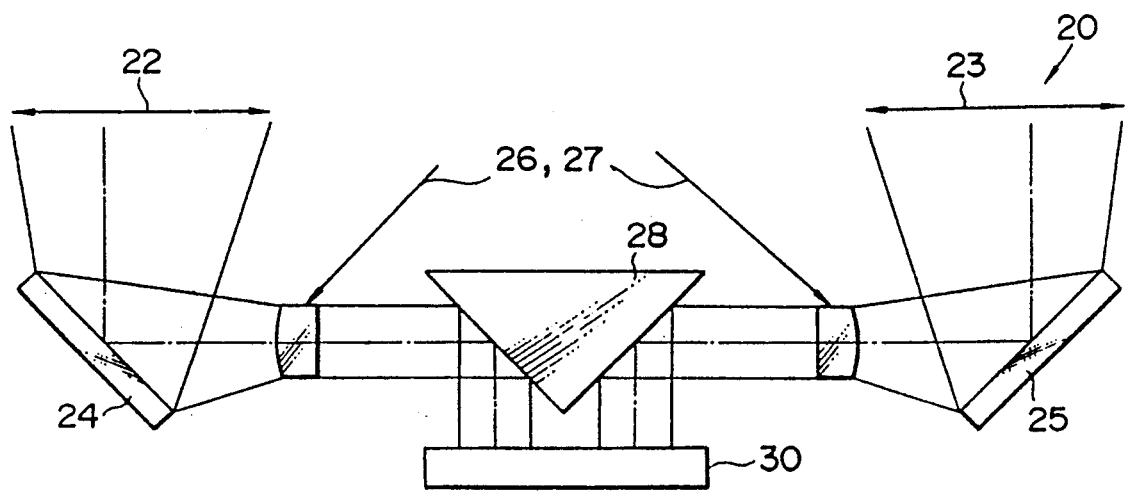
FIGS. 2 and 3 are a bottom and an elevational view of the optical system of a passive distance measuring device.
Figure 3:
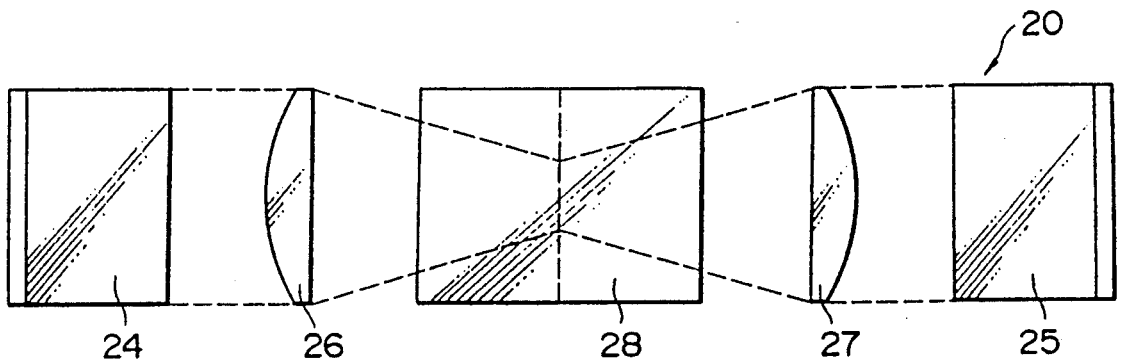

While the strobe pop-up switch 88 is held on, the CPU 80 proceeds from S47 to S61 to receive the possible appropriate irradiation range of the strobe and checks whether the distance measuring value computed in S45 or S59 is within the possible appropriate irradiation range of the strobe (S63). If it is not within the irradiation range, the CPU 80 displays an alarm by means of the in-finder indication unit 103 before performing the lens driving process (S65, S49) and if it is within the irradiation range, performs the lens driving process immediately (S63, S49). It can be constructed that the release button (numeral 18 of FIG. 1) is locked not to be pushed when any one of the computed distance measuring value is not within the irradiation range of the strobe (numeral 19 of FIG. 1).

With the above-described operations, the distance measuring zone 67 is made to coincide with the distance measuring frame 68, irrespective of the focal length, macro or object distance, and the distance measuring and automatic focusing operations are performed in that coincident state. Moreover, the three-dimensional object at the shortest distance can also be focused.

If it is judged that the distance measuring value at the shortest distance selected in S59 is not within the possible appropriate irradiation range of the strobe in S63, a distance measuring value being within the possible appropriate irradiation range of the strobe is searched for from among a plurality of distance measuring values computed in S59 in order that the focusing operation may be based on the selection of an applicable distance measuring value. With the performance of the operation above, an object at least within the distance measuring zone 67 may be photographed at a suitable focus point and a suitable exposure value, using a strobe when a plurality of objects are photographed.

A passive distance measuring device offers inferior distance measuring precision for a dark object (whose luminance is lower than a predetermined value) or what lacks contrast on the surface such as a white wall. In this embodiment, an auxiliary projector element is arranged near the finder. This state is shown in FIGS. 34A, 34B.

The finder is a variable power finder whose field magnification varies interlockingly with the zooming of the zoom lens. The objective lens consists of two variable focusing lenses 121, 122 capable of relative reciprocation, whereas an ocular consists of one fixed lens 123. There are disposed a prism 124 and a half mirror 125 between a variable power lens 122 and a fixed lens 123. In addition, there is arranged a light emitting element (e.g., Infrared) 126 having a wavelength of over 700 nm (nanometer) outside the optical path of the finder and directed towards the half mirror 125. In front of the light emitting element 126 is a grid pattern 127 for forming a stripe pattern. Efficiency will be increased if the half mirror 135 is one which reflects a wavelength of over 700 nm at an angle of 45 degrees and allows visible light to pass therethrough.

The variable power lenses 121, 122 interlock with the zooming of the zoom lens via an interlocking mechanism and vary the field magnification of the finder in proportion to the focal length of the zoom lens by relatively reciprocating themselves. In other words, the finder field is made to substantially coincide with or slightly slight smaller than the photographic image plane, despite the zooming. The interlocking mechanism may be such that the variable power lenses 121, 122 are relatively reciprocated by sliding a cam plate provided with a cam groove by means of a zoom motor, using cam follower pins attached to the variable power lenses 121, 122 and mating with the cam groove.

The optical paths in this embodiment will subsequently be described with reference to the drawings. The prism 124 is composed of three triangle prisms (refer to FIG. 35). The light beam passed through the variable power lenses 121, 122 and introduced from a plane 124a of the prism 124 is downwardly reflected from an incline 124b at a right angle, backwardly reflected from an incline 124c as viewed from the surface of the drawing, upwardly reflected from an incline 124d, reflected again from an incline 124e to the right at a right angle and radiated out of a plane 124f. The light beam thus radiated out is passed through the half mirror 125 and the fixed lens 123 and then comes into photographer's sight.

An auxiliary light beam is emitted from the light emitting element 126 is reflected from the half mirror 125 toward the prism 124, introduced from the plane 124f into the prism 124 and passed through the opposite optical path before being radiated out of the plane 124a. Then the light beam is passed through the variable power lenses 122, 121 and radiated out of the camera to irradiate the object. The auxiliary light beams sent out of the light emitting element 126 are consequently condensed by the variable power lenses 122, 121 so as to irradiate the object.

The converging degree by means of the variable power lenses 122, 121 is low at a wide angle and high at telephoto time. In other words, a wide range is irradiated at a wide angle, whereas a narrow range is irradiated at telephoto time. As a result, an object corresponding to the light receiving range selected in proportion to the focal length can be irradiated. Since the irradiation area at telephoto time is narrowed at telephoto time, an object at a long distance can be irradiated.

As is obvious from the description above, the distance measuring device according to the present invention is such that the range of use of the line sensor is altered in proportion to the focal length of the focal length variable photographic optical system, whereby the focal point of an object at a predetermined position within a predetermined range on the photographic image plane or finder field of the photographic optical system can be detected, irrespective of the focal length of the focal length variable photographic optical system and the object distance.

Moreover, the distance measuring device according to the present invention is such that more than one line sensor is vertically provided in order to alter the line sensor for use and its range of use in proportion to the focal length of the photographic system and the field magnification of the finder, whereby the distance measuring position and the distance measuring range on the photographic image plane or finder field, irrespective of the alteration of the focal length of the photographic lens or the field magnification of the finder.

The distance measuring device according to the present invention is such that the light receiving range of the line sensor is divided into the plurality of sections to above the distance measuring operations carried out in the respective light receiving ranges for a three-dimensional object to ensure that the focal point of the three-dimensional object is detected. Moreover, an inside depletion phenomenon can be prevented if the shortest distance value is selected therefrom. By selecting the shortest distance measuring range within the possible appropriate irradiation range of the strobe from among the plurality of distance measuring values during the use of the strobe, further, an object can be photographed at a proper focus point and a proper exposure value.

The auxiliary projector according to the present invention is such that light is projected by utilizing the variable power lens in the variable power finder to make the angle of irradiation changeable in proportion to the magnification, whereby the range in conformity with the distance measuring zone can be irradiated.

What is claimed is:

1. A distance measuring device for measuring object distance in a camera which is provided with a finder and a photographic lens, the focal length of said photographic lens being variable, said distance measuring device comprising:
   a pair of optical elements provided at the front side of said camera, optical axes of said pair of optical elements being different from the optical axis of said finder;
   line sensor means having a pair of image-receiving areas, each of said image-receiving areas receiving an image of an object to be photographed through said pair of optical elements, said image receiving areas each having a range where light can be received; and
   control means for varying the effective range of each of said image-receiving areas of said line sensor means, depending upon the focal length of said photographic lens.

2. The distance measuring device according to claim 1, wherein each of said optical elements comprises a lens; and wherein said line sensor means comprises a plurality of light receiving segments arranged in a row and extending in a direction crossing the optical axes of said optical elements.

3. The distance measuring device according to claim 1, wherein said camera further comprises an auxiliary light projecting system for projecting a predetermined pattern image toward the photographed object; said photographic lens magnifying said pattern images; and wherein the magnification of said pattern image varies corresponding to the variation of the focal length of said lens.

4. The distance measuring device according to claim 3, wherein the image magnification of said finder is variable corresponding to variation of the focal length of the photographic lens, and wherein said finder comprises a prism therein, said predetermined pattern image being projected through said prism.

5. The distance measuring device according to claim 1, wherein said camera is able to take a macrophotograph; wherein said line sensor means is provided with an additional pair of image-receiving areas arranged to be used when the macrophotograph is taken; and wherein said control means makes ineffective areas of said pair of image-receiving areas when the macrophotograph is to be taken.

6. The distance measuring device according to claim 1, wherein each of said pair of image-receiving areas being divided into a plurality of portions, respectively, and wherein said control means selects one of said portions of said pair of image receiving areas whenever objects to be photographed are three-dimensionally arranged.

7. The distance measuring device according to claim 6, wherein said camera comprises a strobe capable of irradiating photographing objects within a predetermined range of distance; and wherein said control means focuses on one of said photographing objects positioned at a predetermined distance within said predetermined range.

8. The distance measuring device according to claim 7, wherein said predetermined distance is the smallest one of said object distances within said predetermined range.

9. The distance measuring device according to claim 8, wherein said camera comprises alarm means for indicating the condition that the all of said object distances are out of said predetermined range.

10. An automatic focusing camera, comprising:
a pair of optical elements provided at the front side of said camera, optical axes of said pair of optical elements being different from the optical axis of a finder of said camera;
a line sensor means a pair of image-receiving areas for receiving a pair of images of a same photographing object through said pair of optical elements, respectively;
distance measuring means for preliminarily measuring object distance; and
control means for shifting said pair of image-receiving areas of said line sensor means depending upon the object distance obtained by said distance measuring means.

11. The camera according to claim 10, wherein said distance measuring means measures object distance by using said pair of image-receiving areas having been shifted by said control means.

12. The camera according to claim 10, wherein said optical elements comprise a pair of lenses, said lenses and said finder being arranged in a first row; wherein said line sensor means comprises a plurality of light receiving segments arranged in a second row parallel to of said first row; and wherein said control means shifts said image-receiving areas in the direction of said second row.

13. The camera according to claim 11, wherein said optical elements comprise a pair of lenses disposed along a line which is in parallel with one of the longitudinal or lateral directions of the frame of said finder; wherein said line sensor means comprises a plurality of groups of light receiving segments, said groups being disposed one on another in the direction crossing said line, said light receiving elements of each of said groups being arranged in a row in the direction of said line; and wherein said control means shifts said pair of effective image-receiving areas among said groups of light receiving elements.

14. The camera according to claim 12, which is able to take macrophotographs; wherein said line sensor means is provided with an additional pair of image-receiving areas arranged to be used when the macrophotograph is taken; and wherein said control means makes ineffective said pair of image-receiving areas when the macrophotograph is to be taken.

15. The camera according to claim 12, which is able to take macrophotographs; wherein said line sensor means is provided with an additional group of the light receiving elements, on which additional pair of image-receiving areas are formed to be used when the macrophotograph is taken; and wherein said control means makes ineffective said pair of image-receiving areas when the macrophotograph is to be taken.

16. The camera according to claim 10, wherein said control means shifts said pair of image-receiving areas depending upon the smallest object distance if more than one object distances are obtained by said distance measuring means.

17. The camera according to claim 12, which further comprises a photographic lens which magnification is variable, and an auxiliary light projecting system for projecting a predetermined pattern image toward said photographing object, the magnification of said pattern image varying corresponding to the variation of the focal length of said photographic lens.

18. The camera according to claim 17, wherein the image magnification of said finder being variable corresponding to variation of the focal length of the photographic lens; and wherein said finder installs a prism therein, said predetermined pattern image being projected through said prism, whereby the magnification of said pattern image varies corresponding to the variation of the focal length of said photographing lens.

19. The camera according to claim 10, wherein each of said pair of image-receiving areas are divided into a plurality of portions, and wherein said control means shifts one or more of said portions of said pair of image-receiving areas, whenever objects to be photographed are three-dimensionally arranged.

20. The camera according to claim 19, which further comprises a strobe capable of irradiating photographing objects within a predetermined range of distance; and wherein said control means focuses on one of said photographing objects positioned at a predetermined distance within said predetermined range.

21. The camera according to claim 20, wherein said predetermined distance is the closest distance to one of said photographed objects within said predetermined range.

22. The camera according to claim 21, which further comprises alarm means for indicating the condition that the all of said object distances are out of said predetermined range.

23. An automatic focusing camera provided with a photographic lens, the focal length of which is variable, comprising:
a pair of optical elements provided at the front side of said camera, optical axes of said pair of optical elements being different from the optical axis of a finder of said camera;
line sensor means having a pair of image-receiving areas for receiving a pair of images of an object to be photographed through said pair of optical elements, respectively; and
distance measuring means for preliminarily measuring object distance;
first control means for shifting said pair of image-receiving areas of said line sensor means depending upon the object distance obtained by said distance measuring means;
second control means for varying the effective range of the respective image-receiving area of said line sensor means depending upon the focal length of said photographic lens.

24. The camera according to claim 23, wherein the image magnification of said finder is variable corresponding to variation of the focal length of the photographic lens; which further comprises an auxiliary light projecting system for projecting a predetermined pattern image toward the photographing object; and wherein said finder installs a prism therein, said predetermined pattern image being projecting through said prism, whereby the magnification of said pattern image varies corresponding to the variation of the focal length of said photographing lens.

25. The camera according to claim 23, which further comprises an auxiliary light projecting system for projecting a predetermined pattern image toward said photographing object, the magnification of said pattern image varying corresponding to the variation of the focal length of said photographing lens.

26. The camera according to claim 23, wherein said optical elements comprise a pair of lenses, said lenses and said finder being arranged in a first row; wherein said line sensor means comprises a plurality of light receiving segments arranged in a second row extending in the same direction of said first row; and wherein said first control means shifts said image-receiving areas in the direction of said second row.

27. The camera according to claim 23, wherein said optical elements comprises a pair of lenses disposed along a line which is in parallel with one of the longittudinal and lateral directions of the frame of said finder; wherein said line sensor means comprises a plurality of groups of light receiving segments, said groups being disposed one on another in the direction crossing said line, said light receiving elements of each of said groups being arranged in a row in the direction of said line; and wherein said first control means shifts said pair of image-receiving areas among said groups of light receiving elements.

28. The camera according to claim 25, which is able to take macrophotographs; wherein said line sensor means is provided with an additional pair of image-receiving areas arranged to be used when the macrophotograph is taken; and wherein said first control means makes ineffective of said pair of image-receiving areas when the macrophotograph is to be taken.

29. The camera according to claim 26, which is able to take macrophotographs; wherein said line sensor means is provided with an additional group of the light receiving elements, on which additional pair image-receiving areas are formed to be used when the macrophotograph is taken; and wherein said first control means makes ineffective said pair of image-receiving areas when the macrophotograph is to be taken.

30. The camera according to claim 25, wherein said first control means shifts said pair of image-receiving areas depending upon the smallest object distance if more than one object distances are obtained by said distance measuring means.

31. The camera according to claim 25, wherein the image magnification of said finder is variable corresponding to variation of the focal length of the photographic lens; and wherein said finder installs a prism therein, said predetermined pattern image being projected through said prism, whereby the magnification of said pattern image varies corresponding to variation of the focal length of said photographing lens.

32. The camera according to claim 23, wherein each of said pair of image-receving areas being divided into more than one portions, respectively, and wherein said second control means selects ones of said portions of said pair image-receiving areas, respectively, in order to obtain object distances at more than one point of said photographed object.

33. The camera according to claim 32, which further comprises a strobe capable of irradiating photographing objects within a predetermined range of distance; and wherein said control means focuses on one of said photographed objects positioned at a predetermined distance within said predetermined range.

34. The camera according to claim 33 wherein said predetermined distance is the closest distance to one of said photographed objects within said predetermined range.

35. The camera according to claim 34, which further comprises alarm means for indicating the condition that the all of said object distances are out of said predetermined range.

36. An automatic focusing camera, comprising:
a photographic lens, the focal length of which is variable; and
an auxiliary light projecting system for projecting a predetermined pattern image toward the photographing object, the magnification of said pattern image varying corresponding to the variation of the focal length of said photographing lens.

37. The camera according to claim 36, which further comprises a finder, the image magnification of said finder being variable corresponding to the variation of the focal length of thhe photographic lens; and wherein said finder installs a prism therein, said predetermined pattern image being projected through said prism, whereby the magnification of said pattern image varies corresponding to variation of the focal length of said photographing lens.

38. An automatic focusing camera, comprising:
a pair of optical elements provided at the front side of said camera, optical axes of said pair of optical elements being different from the optical axis of a finder of said camera;
line sensor means having a pair of image-receiving areas for receiving a pair of images of a same photographing object through said pair of optical element, each of said pair of image-receiving areas being divided into more than one poritons, respectively; and
control means for selecting ones of said portions of said pair of image-receiving areas, respectively, in order to obtain object distances at more than one points of the photographing object.

39. The camera according to claim 38, which further comprises a strobe capable of irradiating photographing objects within a predetermined range of distance; and wherein said control means focuses on one of said photographed objects positioned at a predetermined distance within said predetermined range.

40. The camera according to claim 39, which further comprises alarm means for indicating the condition that the all of the object distances are out of said predetermined range.

41. The camera according to claim 40, wherein said predetermined distance is the smallest one of said object distances within said predetermined range.

* * * * *

UNITED STATES PATENT AND TRADEMARK OFFICE
CERTIFICATE OF CORRECTION

PATENT NO. : 5,051,767
DATED : September 24, 1991
INVENTOR(S) : Akira HONMA et al.

It is certified that error appears in the above-indentified patent and that said Letters Patent is hereby corrected as shown below:

On the cover page, at section [56] line 5, under <u>Foreign Patent Documents</u>, change "63-35909" to ---63-235909---.

Signed and Sealed this

Eighteenth Day of April, 1995

Attest:

BRUCE LEHMAN

*Attesting Officer*     *Commissioner of Patents and Trademarks*